(12) United States Patent
Brown et al.

(10) Patent No.: US 9,454,055 B2
(45) Date of Patent: Sep. 27, 2016

(54) MULTIPURPOSE CONTROLLER FOR MULTISTATE WINDOWS

(75) Inventors: Stephen C. Brown, San Mateo, CA (US); Dhairya Shrivastava, Los Altos, CA (US); David Walter Groechel, Sunnyvale, CA (US); Anshu Pradhan, Fremont, CA (US); Gordon Jack, Santa Clara, CA (US); Disha Mehtani, Mountain View, CA (US); Robert T. Rozbicki, San Jose, CA (US)

(73) Assignee: View, Inc., Milpitas, CA (US)

( * ) Notice: Subject to any disclaimer, the term of this patent is extended or adjusted under 35 U.S.C. 154(b) by 202 days.

(21) Appl. No.: 13/049,756

(22) Filed: Mar. 16, 2011

(65) Prior Publication Data

US 2012/0239209 A1    Sep. 20, 2012

(51) Int. Cl.
| | |
|---|---|
| G05B 13/00 | (2006.01) |
| G02F 1/163 | (2006.01) |
| H04L 12/28 | (2006.01) |
| E06B 7/28 | (2006.01) |
| G02F 1/133 | (2006.01) |

(52) U.S. Cl.
CPC ............... *G02F 1/163* (2013.01); *E06B 7/28* (2013.01); *G02F 1/13318* (2013.01); *H04L 12/2803* (2013.01)

(58) Field of Classification Search
USPC ........ 700/130, 276, 277, 278, 291, 299, 300
See application file for complete search history.

(56) References Cited

U.S. PATENT DOCUMENTS

| | | | |
|---|---|---|---|
| 5,124,833 A | 6/1992 | Barton et al. | |
| 5,170,108 A * | 12/1992 | Peterson et al. | 318/469 |
| 5,204,778 A | 4/1993 | Bechtel | |
| 5,220,317 A | 6/1993 | Lynam et al. | |
| 5,290,986 A * | 3/1994 | Colon et al. | 219/770 |
| 5,353,148 A * | 10/1994 | Eid et al. | 359/265 |
| 5,365,365 A | 11/1994 | Ripoche et al. | |
| 5,379,146 A | 1/1995 | Defendini | |
| 5,384,578 A | 1/1995 | Lynam et al. | |

(Continued)

FOREIGN PATENT DOCUMENTS

| | | |
|---|---|---|
| CN | 2590732 Y | 12/2003 |
| CN | 1534413 A | 10/2004 |

(Continued)

OTHER PUBLICATIONS

U.S. Appl. No. 13/449,235, filed Apr. 17, 2012.
U.S. Appl. No. 13/449,248, filed Apr. 17, 2012.
U.S. Appl. No. 13/449,251, filed Apr. 17, 2012.
U.S. Appl. No. 13/479,137, filed May 23, 2012.
U.S. Appl. No. 13/309,990, filed Dec. 2, 2011.
US Final Office Action dated Apr. 30, 2012 issued in U.S. Appl. No. 13/049,750.

(Continued)

*Primary Examiner* — Carlos Ortiz Rodriguez
(74) *Attorney, Agent, or Firm* — Weaver Austin Villeneuve & Sampson LLP; Brian D. Griedel

(57) ABSTRACT

Controllers for providing functions for windows capable of undergoing reversible optical transitions. In some cases, the controllers have multiple features that can sense and adapt to local environmental conditions. The controllers can be integrated with a building management system (BMS) to greatly enhance the BMS's effectiveness at managing local environments in a building. For example, controllers may control one or more functions such as powering a smart window, determining the percent transmittance, size, and/or temperature of a smart window, providing wireless communication between the controller and a separate communication node, etc.

38 Claims, 5 Drawing Sheets

(56) References Cited

U.S. PATENT DOCUMENTS

| | | | |
|---|---|---|---|
| 5,402,144 A | 3/1995 | Ripoche | |
| 5,451,822 A | 9/1995 | Bechtel et al. | |
| 5,598,000 A | 1/1997 | Popat | |
| 5,621,526 A | 4/1997 | Kuze | |
| 5,673,028 A | 9/1997 | Levy | |
| 5,694,144 A | 12/1997 | Lefrou et al. | |
| 5,764,402 A | 6/1998 | Thomas et al. | |
| 5,822,107 A | 10/1998 | Lefrou et al. | |
| 5,900,720 A | 5/1999 | Kallman et al. | |
| 5,956,012 A | 9/1999 | Turnbull et al. | |
| 5,973,818 A | 10/1999 | Sjursen et al. | |
| 5,973,819 A | 10/1999 | Pletcher et al. | |
| 5,978,126 A | 11/1999 | Sjursen et al. | |
| 6,039,390 A | 3/2000 | Agrawal et al. | |
| 6,039,850 A | 3/2000 | Schulz et al. | |
| 6,055,089 A | 4/2000 | Schulz et al. | |
| 6,064,949 A | 5/2000 | Werner et al. | |
| 6,084,231 A | 7/2000 | Popat | |
| 6,084,700 A | 7/2000 | Knapp et al. | |
| 6,130,448 A | 10/2000 | Bauer et al. | |
| 6,130,772 A | 10/2000 | Cava | |
| 6,222,177 B1 | 4/2001 | Bechtel et al. | |
| 6,262,831 B1 | 7/2001 | Bauer et al. | |
| 6,386,713 B1 | 5/2002 | Turnbull et al. | |
| 6,407,468 B1 | 6/2002 | LeVesque et al. | |
| 6,407,847 B1 | 6/2002 | Poll et al. | |
| 6,449,082 B1 | 9/2002 | Agrawal et al. | |
| 6,471,360 B2 * | 10/2002 | Rukavina et al. | 359/609 |
| 6,535,126 B2 | 3/2003 | Lin et al. | |
| 6,567,708 B1 | 5/2003 | Bechtel et al. | |
| 6,614,577 B1 | 9/2003 | Yu et al. | |
| 6,795,226 B2 * | 9/2004 | Agrawal et al. | 359/265 |
| 6,829,511 B2 | 12/2004 | Bechtel et al. | |
| 6,856,444 B2 | 2/2005 | Ingalls et al. | |
| 6,897,936 B1 | 5/2005 | Li et al. | |
| 6,940,627 B2 | 9/2005 | Freeman et al. | |
| 7,085,609 B2 | 8/2006 | Bechtel et al. | |
| 7,133,181 B2 * | 11/2006 | Greer | 359/265 |
| 7,215,318 B2 | 5/2007 | Turnbull et al. | |
| 7,277,215 B2 | 10/2007 | Greer | |
| 7,304,787 B2 | 12/2007 | Whitesides et al. | |
| 7,417,397 B2 | 8/2008 | Berman et al. | |
| 7,542,809 B2 | 6/2009 | Bechtel et al. | |
| 7,548,833 B2 | 6/2009 | Ahmed | |
| 7,567,183 B2 * | 7/2009 | Schwenke | 340/602 |
| 7,610,910 B2 | 11/2009 | Ahmed | |
| 7,817,326 B1 | 10/2010 | Rennig et al. | |
| 7,822,490 B2 | 10/2010 | Bechtel et al. | |
| 7,873,490 B2 | 1/2011 | MacDonald | |
| 7,941,245 B1 | 5/2011 | Popat | |
| 7,972,021 B2 | 7/2011 | Scherer | |
| 7,990,603 B2 | 8/2011 | Ash et al. | |
| 8,004,739 B2 | 8/2011 | Letocart | |
| 8,018,644 B2 | 9/2011 | Gustavsson et al. | |
| 8,102,586 B2 | 1/2012 | Albahri | |
| 8,213,074 B1 | 7/2012 | Shrivastava et al. | |
| 8,254,013 B2 | 8/2012 | Mehtani et al. | |
| 8,292,228 B2 | 10/2012 | Mitchell et al. | |
| 8,456,729 B2 | 6/2013 | Brown et al. | |
| 8,547,624 B2 | 10/2013 | Ash et al. | |
| 8,705,162 B2 | 4/2014 | Brown et al. | |
| 8,723,467 B2 | 5/2014 | Berman et al. | |
| 8,836,263 B2 | 9/2014 | Berman et al. | |
| 8,864,321 B2 | 10/2014 | Mehtani et al. | |
| 8,902,486 B1 | 12/2014 | Chandrasekhar | |
| 8,976,440 B2 | 3/2015 | Berland et al. | |
| 9,016,630 B2 | 4/2015 | Mitchell et al. | |
| 9,030,725 B2 | 5/2015 | Pradhan et al. | |
| 9,078,299 B2 | 7/2015 | Ashdown | |
| 9,081,247 B1 | 7/2015 | Pradhan et al. | |
| 9,226,366 B2 | 12/2015 | Orillard et al. | |
| 9,298,203 B2 | 3/2016 | Wenzel | |
| 9,348,192 B2 | 5/2016 | Brown et al. | |
| 2002/0075472 A1 | 6/2002 | Holton | |
| 2002/0152298 A1 | 10/2002 | Kikta et al. | |
| 2003/0191546 A1 | 10/2003 | Bechtel et al. | |
| 2003/0210449 A1 | 11/2003 | Ingalls et al. | |
| 2003/0210450 A1 | 11/2003 | Yu et al. | |
| 2003/0227663 A1 | 12/2003 | Agrawal et al. | |
| 2003/0227664 A1 | 12/2003 | Agrawal et al. | |
| 2004/0001056 A1 | 1/2004 | Atherton et al. | |
| 2004/0135989 A1 | 7/2004 | Klebe | |
| 2004/0160322 A1 * | 8/2004 | Stilp | 340/572.1 |
| 2005/0046920 A1 | 3/2005 | Freeman et al. | |
| 2005/0200934 A1 | 9/2005 | Callahan et al. | |
| 2005/0225830 A1 | 10/2005 | Huang et al. | |
| 2005/0268629 A1 | 12/2005 | Ahmed | |
| 2005/0270620 A1 | 12/2005 | Bauer et al. | |
| 2005/0278047 A1 | 12/2005 | Ahmed | |
| 2006/0018000 A1 | 1/2006 | Greer | |
| 2006/0107616 A1 | 5/2006 | Ratti et al. | |
| 2006/0170376 A1 | 8/2006 | Piepgras et al. | |
| 2006/0187608 A1 | 8/2006 | Stark | |
| 2006/0209007 A1 | 9/2006 | Pyo et al. | |
| 2006/0245024 A1 | 11/2006 | Greer | |
| 2007/0002007 A1 | 1/2007 | Tam | |
| 2007/0067048 A1 | 3/2007 | Bechtel et al. | |
| 2007/0162233 A1 | 7/2007 | Schwenke | |
| 2007/0285759 A1 | 12/2007 | Ash et al. | |
| 2008/0018979 A1 | 1/2008 | Mahe et al. | |
| 2009/0020233 A1 | 1/2009 | Berman et al. | |
| 2009/0027759 A1 | 1/2009 | Albahri | |
| 2009/0066157 A1 | 3/2009 | Tarng et al. | |
| 2009/0143141 A1 | 6/2009 | Wells et al. | |
| 2009/0243732 A1 | 10/2009 | Tarng et al. | |
| 2009/0243802 A1 | 10/2009 | Wolf et al. | |
| 2009/0296188 A1 | 12/2009 | Jain et al. | |
| 2010/0039410 A1 | 2/2010 | Becker et al. | |
| 2010/0066484 A1 | 3/2010 | Hanwright et al. | |
| 2010/0082081 A1 | 4/2010 | Niessen et al. | |
| 2010/0172009 A1 | 7/2010 | Matthews | |
| 2010/0172010 A1 | 7/2010 | Gustavsson et al. | |
| 2010/0188057 A1 | 7/2010 | Tarng | |
| 2010/0235206 A1 | 9/2010 | Miller et al. | |
| 2010/0243427 A1 | 9/2010 | Kozlowski et al. | |
| 2010/0245972 A1 | 9/2010 | Wright | |
| 2010/0315693 A1 | 12/2010 | Lam et al. | |
| 2011/0046810 A1 | 2/2011 | Bechtel et al. | |
| 2011/0063708 A1 | 3/2011 | Letocart | |
| 2011/0066302 A1 | 3/2011 | McEwan | |
| 2011/0148218 A1 | 6/2011 | Rozbicki | |
| 2011/0164304 A1 | 7/2011 | Brown et al. | |
| 2011/0167617 A1 | 7/2011 | Letocart | |
| 2011/0235152 A1 | 9/2011 | Letocart | |
| 2011/0249313 A1 | 10/2011 | Letocart | |
| 2011/0255142 A1 | 10/2011 | Ash et al. | |
| 2011/0266419 A1 | 11/2011 | Jones et al. | |
| 2011/0292488 A1 | 12/2011 | McCarthy et al. | |
| 2011/0304898 A1 | 12/2011 | Letocart | |
| 2012/0026573 A1 | 2/2012 | Collins et al. | |
| 2012/0062975 A1 | 3/2012 | Mehtani et al. | |
| 2012/0133315 A1 | 5/2012 | Berman et al. | |
| 2012/0190386 A1 | 7/2012 | Anderson | |
| 2012/0194895 A1 | 8/2012 | Podbelski et al. | |
| 2012/0200908 A1 | 8/2012 | Bergh et al. | |
| 2012/0236386 A1 | 9/2012 | Mehtani et al. | |
| 2012/0268803 A1 | 10/2012 | Greer | |
| 2012/0293855 A1 | 11/2012 | Shrivastava et al. | |
| 2013/0021659 A1 | 1/2013 | Friedman et al. | |
| 2013/0057937 A1 | 3/2013 | Berman et al. | |
| 2013/0158790 A1 | 6/2013 | McIntyre, Jr. et al. | |
| 2013/0242370 A1 | 9/2013 | Wang | |
| 2013/0263510 A1 | 10/2013 | Gassion | |
| 2013/0271812 A1 | 10/2013 | Brown et al. | |
| 2013/0271813 A1 | 10/2013 | Brown | |
| 2013/0271814 A1 | 10/2013 | Brown | |
| 2013/0271815 A1 | 10/2013 | Pradhan et al. | |
| 2014/0067733 A1 | 3/2014 | Humann | |
| 2014/0104667 A1 | 4/2014 | Greer et al. | |
| 2014/0160550 A1 | 6/2014 | Brown et al. | |
| 2014/0236323 A1 | 8/2014 | Brown et al. | |
| 2014/0259931 A1 | 9/2014 | Plummer | |
| 2014/0268287 A1 | 9/2014 | Brown et al. | |
| 2014/0300945 A1 | 10/2014 | Parker | |

(56) References Cited

U.S. PATENT DOCUMENTS

| | | |
|---|---|---|
| 2014/0303788 A1 | 10/2014 | Sanders |
| 2014/0330538 A1 | 11/2014 | Conklin et al. |
| 2014/0371931 A1 | 12/2014 | Lin et al. |
| 2015/0002919 A1 | 1/2015 | Jack et al. |
| 2015/0049378 A1 | 2/2015 | Shrivastava et al. |
| 2015/0060648 A1 | 3/2015 | Brown et al. |
| 2015/0070745 A1 | 3/2015 | Pradhan |
| 2015/0116811 A1 | 4/2015 | Shrivastava et al. |
| 2015/0122474 A1 | 5/2015 | Petersen |
| 2015/0368967 A1 | 12/2015 | Lundy et al. |
| 2016/0054633 A1 | 2/2016 | Brown et al. |
| 2016/0054634 A1 | 2/2016 | Brown et al. |
| 2016/0124283 A1 | 5/2016 | Brown et al. |
| 2016/0203403 A1 | 7/2016 | Nagel et al. |

FOREIGN PATENT DOCUMENTS

| | | |
|---|---|---|
| CN | 1704556 A | 12/2005 |
| CN | 101707892 A | 5/2010 |
| CN | 101969207 A | 2/2011 |
| CN | 102203370 A | 9/2011 |
| CN | 102330530 A | 1/2012 |
| DE | 10124673 A1 | 11/2002 |
| EP | 0445314 | 9/1991 |
| EP | 0 869 032 | 10/1998 |
| EP | 1078818 A2 | 2/2001 |
| EP | 0835475 B1 | 9/2004 |
| EP | 1510854 A1 | 3/2005 |
| EP | 1417535 | 11/2005 |
| EP | 1619546 A2 | 1/2006 |
| EP | 0920210 | 6/2009 |
| EP | 2 161 615 | 3/2010 |
| EP | 2 357 544 | 8/2011 |
| EP | 2764998 A1 | 8/2014 |
| GB | 2462754 A | 5/2004 |
| JP | 63-208830 | 8/1988 |
| JP | 02-132420 | 5/1990 |
| JP | 05-178645 | 7/1993 |
| JP | 10-063216 | 3/1998 |
| JP | 2004-245985 | 9/2004 |
| JP | 4694816 B2 | 6/2011 |
| JP | 4799113 B2 | 10/2011 |
| JP | 2013-057975 A | 3/2013 |
| KR | 20-0412640 | 3/2006 |
| KR | 10-752041 B1 | 8/2007 |
| KR | 10-2008-0022319 | 3/2008 |
| KR | 10-2009-0026181 | 3/2009 |
| KR | 10-0904847 | 6/2009 |
| KR | 10-0931183 | 12/2009 |
| KR | 10-2010-0034361 | 4/2010 |
| KR | 10-2011-0003698 | 1/2011 |
| KR | 10-2011-0094672 | 8/2011 |
| TW | 200532346 A | 10/2005 |
| TW | 200920987 A | 5/2009 |
| TW | 201029838 A | 8/2010 |
| WO | WO96/32560 A1 | 10/1996 |
| WO | WO 98/16870 | 4/1998 |
| WO | WO2002-13052 | 2/2002 |
| WO | WO 2004/003649 | 1/2004 |
| WO | WO2005/098811 | 10/2005 |
| WO | WO 2005/103807 | 11/2005 |
| WO | WO2007/016546 A2 | 2/2007 |
| WO | WO 2007/146862 | 12/2007 |
| WO | WO 2008/030018 | 3/2008 |
| WO | WO 2008/147322 | 12/2008 |
| WO | WO 2009/124647 | 10/2009 |
| WO | WO2010/120771 | 10/2010 |
| WO | WO 2011/020478 | 2/2011 |
| WO | WO 2011/087684 | 7/2011 |
| WO | WO 2011/087687 | 7/2011 |
| WO | WO2011/124720 | 10/2011 |
| WO | WO 2011/127015 | 10/2011 |
| WO | WO2012/079159 | 6/2012 |
| WO | WO 2012/080618 | 6/2012 |
| WO | WO 2012/080656 | 6/2012 |
| WO | WO 2012/080657 | 6/2012 |
| WO | WO2012/145155 | 10/2012 |
| WO | WO2013/059674 | 4/2013 |
| WO | WO2013/109881 | 7/2013 |
| WO | WO2013/155467 | 10/2013 |
| WO | WO2014/121863 | 8/2014 |
| WO | WO2014/130471 | 8/2014 |
| WO | WO2014/134451 | 9/2014 |
| WO | WO2014/209812 A1 | 12/2014 |
| WO | WO2015/077097 A1 | 5/2015 |
| WO | WO2015/171886 | 11/2015 |
| WO | WO2016/029156 A1 | 2/2016 |
| WO | WO2016/029165 A2 | 2/2016 |

OTHER PUBLICATIONS

US Notice of Allowance dated May 8, 2012 issued in U.S. Appl. No. 13/049,750.
US Office Action dated Mar. 27, 2012 issued in U.S. Appl. No. 13/049,623.
US Notice of Allowance dated Jul. 20, 2012 issued in U.S. Appl. No. 13/049,623.
US Office Action dated Feb. 3, 2012 issued in U.S. Appl. No. 13/049,750.
International Search Report and Written Opinion dated Sep. 24, 2012, issued in PCT/US2012/027909.
International Search Report and Written Opinion dated Sep. 24, 2012, issued in PCT/US2012/027742.
International Search Report and Written Opinion dated Sep. 26, 2012, issued in PCT/US2012/027828.
International Search Report and Written Opinion dated Mar. 28, 2013 in PCT/US2012/061137.
Lim, Sunnie H.N. et al., "Modeling of optical and energy performance of tungsten-oxide-based electrochromic windows including their intermediate states," Solar Energy Materials & Solar Cells, vol. 108, Oct. 16, 2012, pp. 129-135.
U.S. Appl. No. 13/968,258, filed Aug. 15, 2013.
U.S. Appl. No. 13/772,969, filed Feb. 21, 2013.
U.S. Appl. No. 13/931,459, filed Jun. 28, 2013.
US Office Action dated Sep. 23, 2013 in U.S. Appl. No. 13/479,137.
US Office Action dated Dec. 24, 2013 in U.S. Appl. No. 13/309,990.
US Office Action dated Oct. 11, 2013 in U.S. Appl. No. 13/449,235.
US Notice of Allowance dated Janaury 10, 2014 in U.S. Appl. No. 13/449,235.
US Office Action dated Nov. 29, 2013 in U.S. Appl. No. 13/449,248.
US Office Action dated Nov. 29, 2013 in U.S. Appl. No. 13/449,251.
International Search Report and Written Opinion dated Jul. 23, 2013, issued in PCT/US2013/036235.
International Search Report and Written Opinion dated Jul. 26, 2013, issued in PCT/US2013/036456.
International Search Report and Written Opinion dated Jul. 11, 2013, issued in PCT/US2013/034998.
"SageGlass helps Solar Decathlon- and AIA award-winning home achieve net-zero energy efficiency" in MarketWatch.com, http://www.marketwatch.com/story/sageglass-helps-solar-decathlon-and-aia-award-winning-home-achieve-net-zero-energy-efficiency-2012-06-07, Jun. 7, 2012.
"New from Pella: Windows with Smartphone-run blinds", Pella Corp., http://www.desmoinesregister.com/article/20120114/Business/301140031/0/biggame/?odyssey=nav%7Chead, Jan. 13, 2012.
"How Cleantech wants to make a 2012 comeback" http://mountainview.patch.com/articles/how-cleantech-wants-to-make-a-2012-comeback, Jan. 23, 2012.
U.S. Appl. No. 14/535,080, filed Nov. 6, 2014 + preliminary amendment filed Nov. 7, 2014.
Preliminary Amendment filed Oct. 7, 2014 for U.S. Appl. No. 14/391,122.
U.S. Office Action dated Oct. 6, 2014 in U.S. Appl. No. 13/968,258.
US Final Office Action dated Jan. 27, 2014 in U.S. Appl. No. 13/479,137.
US Office Action dated Jul. 3, 2014 in U.S. Appl. No. 13/479,137.
US Office Action dated Jan. 16, 2015 in U.S. Appl. No. 14/468,778.
Notice of Allowanced dated Jun. 17, 2014 in U.S. Appl. No. 13/309,990.

(56) References Cited

OTHER PUBLICATIONS

US Final Office Action dated May 16, 2014 in U.S. Appl. No. 13/449,248.
US Office Action dated Sep. 29, 2014 in U.S. Appl. No. 13/449,248.
US Final Office Action dated May 15, 2014 in U.S. Appl. No. 13/449,251.
US Office Action dated Oct. 28, 2014 in U.S. Appl. No. 13/449,251.
US Office Action dated Sep. 15, 2014 in U.S. Appl. No. 13/682,618.
US Notice of Allowance dated Jan. 22, 2015 in U.S. Appl. No. 13/682,618.
Letter dated Dec. 1, 2014 re Prior Art re U.S. Appl. No. 13/772,969 from Ryan D. Ricks representing MechoShade Systems, Inc.
International Preliminary Report on Patentability dated Sep. 26, 2013, issued in PCT/US2012/027828.
International Preliminary Report on Patentability dated Sep. 26, 2013, issued in PCT/US2012/027909.
International Preliminary Report on Patentability dated Sep. 26, 2013, issued in PCT/US2012/027742.
International Preliminary Report on Patentability dated May 1, 2014 in PCT/US2012/061137.
International Preliminary Report on Patentability dated Oct. 30, 2014 issued in PCT/US2013/036235.
International Preliminary Report on Patentability dated Oct. 23, 2014 issued in PCT/US2013/036456.
International Preliminary Report on Patentability dated Oct. 30, 2014 issued in PCT/US2013/034998.
International Search Report and Written Opinion dated Dec. 26, 2013, issued in PCT/US2013/053625.
International Search Report and Written Opinion dated May 26, 2014, issued in PCT/US2014/016974.
International Search Report and Written Opinion dated Oct. 16, 2014, issued in PCT/US2014/043514.
European Search Report dated Aug. 11, 2014 in European Application No. 12757877.1.
European Search Report dated Jul. 29, 2014 in European Application No. 12758250.0.
European Search Report dated Jul. 23, 2014 in European Application No. 12756917.6.
APC by Schneider Electric, Smart-UPS 120V Product Brochure, 2013, 8 pages.
Hoosier Energy, "How do they do that? Measuring Real-Time Cloud Activity" Hoosier Energy Current Connections, undated. (http://members.questline.com/Article.aspx?articleID=18550&accountID=196000&nl=11774).
Kleissl, Jan et al., "Recent Advances in Solar Variability Modeling and Solar Forecasting at UC San Diego," Proceedings, American Solar Energy Society, 2013 Solar Conference, Apr. 16-20, 2013, Baltimore, MD.
Haby, Jeff, "Cloud Detection (IR v. VIS)," (undated) [http://theweatherprediction.com/habyhints2/512/].
Graham, Steve, "Clouds & Radiation," Mar. 1, 1999. [http://earthobservatory.nasa.gov/Features/Clouds/].
National Aeronautics & Space Administration, "Cloud Radar System (CRS)," (undated) [http://har.gsfc.nasa.gov/index.php?section=12].
Science and Technology Facilities Council. "Cloud Radar: Predicting the Weather More Accurately." ScienceDaily, Oct. 1, 2008. [www.sciencedaily.com/releases/2008/09/080924085200.htm].
"Remote Sensing: Clouds," Department of Atmospheric and Ocean Science, University of Maryland, (undated) [http://www.atmos.umd.edu/~pinker/remote_sensing_clouds.htm].
National Aeronautics & Space Administration, "Cloud Remote Sensing and Modeling," (undated) [http://atmospheres.gsfc.nasa.gov/climate/index.php?section=134].
Kipp & Zonen, "Solar Radiation" (undated) [http://www.kippzonen.com/Knowledge-Center/Theoretical-info/Solar-Radiation].
Duchon, Claude E. et al., "Estimating Cloud Type from Pyranometer Observations," Journal of Applied Meteorology, vol. 38, Jan. 1999, pp. 132-141.
U.S. Appl. No. 14/468,778, filed Aug. 26, 2014.
U.S. Appl. No. 14/489,414, filed Sep. 17, 2014.
U.S. Appl. No. 14/657,380, filed Mar. 13, 2015 + preliminary amendment filed Mar. 16, 2015.
U.S. Appl. No. 14/735,043, filed Jun. 9, 2015 and Preliminary Amendment filed Jul. 2, 2015.
U.S. Final Office Action dated Jun. 5, 2015 U.S. Appl. No. 13/968,258.
US Final Office Action dated Feb. 26, 2015 in U.S. Appl. No. 13/479,137.
US Notice of Allowance dated May 14, 2015 in U.S. Appl. No. 13/479,137.
US Notice of Allowance (supplemental) dated Jun. 12, 2015 in U.S. Appl. No. 13/479,137.
US Office Action dated Feb. 24, 2015 in U.S. Appl. No. 14/163,026.
US Office Action dated Jun. 3, 2015 in U.S. Appl. No. 13/449,251.
US Notice of Allowance dated Apr. 13, 2015 in U.S. Appl. No. 14/657,380.
Third-Party Submission dated Feb. 2, 2015 and Feb. 18, 2015 PTO Notice re Third-Party Submission for U.S. Appl. No. 13/772,969.
International Preliminary Report on Patentability dated Feb. 19, 2015 issued in PCT/US2013/053625.
Communication re Third-Party Observation dated Dec. 4, 2014 and Third-Party Observation dated Dec. 3, 2014 in PCT/US2014/016974.
Chinese Office Action dated Mar. 26, 2015 in Chinese Application No. 2015032301101560.
European Search Report dated Mar. 5, 2015 in European Application No. 12841714.4.
U.S. Appl. No. 14/932,474, filed Nov. 4, 2015.
Preliminary Amendment for U.S. Appl. No. 14/932,474, filed Nov. 5, 2015.
US Patent Application entitled Controlling Transitions in Optically Switchable Devices filed Jan. 12, 2016 for U.S. Appl. No. 14/993,822.
Preliminary Amendment filed Jan. 13, 2016 for U.S. Appl. No. 14/993,822.
U.S. Appl. No. 14/931,390, filed Nov. 3, 2015.
Preliminary Amendment filed Dec. 22, 2015 for U.S. Appl. No. 13/772,969.
US Office Action dated Nov. 27, 2015 in U.S. Appl. No. 14/163,026.
US Office Action dated Nov. 19, 2015 in U.S. Appl. No. 14/535,080.
US Office Action dated Feb. 22, 2016 in U.S. Appl. No. 14/535,080.
US Office Action dated Jan. 5, 2016 in U.S. Appl. No. 13/772,969.
Taiwanese Office Action dated Jan. 11, 2016 in TW Application No. 101108958.
International Preliminary Report on Patentability dated Sep. 3, 2015, issued in PCT/US2014/016974.
Chinese Office Action dated Jun. 26, 2015 in Chinese Application No. 201280023631.4.
Chinese Office Action dated Oct. 10, 2015 in Chinese Application No. 201380026428.7.
EPO Communication dated Sep. 2, 2015 in European Application No. 14753897.9 re Third-Party Observations.
US Office Action dated Apr. 14, 2016 in U.S. Appl. No. 14/163,026.
Notice of Allowance dated Apr. 4, 2016 in U.S. Appl. No. 14/535,080.
Chinese Office Action dated Apr. 5, 2016 in Chinese Application No. 201280023631.4.
European Search Report dated May 11, 2016 in European Application No. 13777540.9.
International Search Report and Written Opinion dated Jul. 23, 2015 in PCT/US2015/029675.
Benson D. K. et al., "Design goals and challenges for a photovoltaic-powered electrochromic window covering", Solar Energy Materials and Solar Cells, vol. 39, No. 2/04, Dec. 1995, pp. 203-211.
Notice of Allowance dated Jun. 8, 2016 in U.S. Appl. No. 14/163,026.

\* cited by examiner

MULTIPURPOSE CONTROLLER FOR MULTISTATE WINDOWS

CROSS REFERENCE TO RELATED APPLICATIONS

The application is related to U.S. patent application Ser. No. 13/049,623 (issued as U.S. Pat. No. 8,254,013) naming Pradhan, Mehtani, and Jack as inventors, titled "Controlling Transitions In Optically Switchable Devices" and filed on the same day as the present application and U.S. patent application Ser. No. 13/049,750 (issued as U.S. Pat. No. 8,213,074), titled "Onboard Controller for Multistate Windows" and filed on the same day as the present application, both incorporated herein by reference in their entireties and for all purposes.

FIELD

The invention relates generally to electrochromic devices, more particularly to controllers for electrochromic windows.

BACKGROUND

Electrochromism is a phenomenon in which a material exhibits a reversible electrochemically-mediated change in an optical property when placed in a different electronic state, typically by being subjected to a voltage change. The optical property is typically one or more of color, transmittance, absorbance, and reflectance. One well known electrochromic material is tungsten oxide ($WO_3$). Tungsten oxide is a cathodic electrochromic material in which a coloration transition, transparent to blue, occurs by electrochemical reduction.

Electrochromic materials may be incorporated into, for example, windows for home, commercial and other uses. The color, transmittance, absorbance, and/or reflectance of such windows may be changed by inducing a change in the electrochromic material, that is, electrochromic windows are windows that can be darkened or lightened electronically. A small voltage applied to an electrochromic device (EC) of the window will cause them to darken; reversing the voltage causes them to lighten. This capability allows control of the amount of light that passes through the windows, and presents an opportunity for electrochromic windows to be used as energy-saving devices.

While electrochromism was discovered in the 1960's, EC devices, and particularly EC windows, still unfortunately suffer various problems and have not begun to realize their full commercial potential despite many recent advancements in EC technology, apparatus and related methods of making and/or using EC devices.

SUMMARY OF INVENTION

"Smart" controllers for EC windows are described. Controllers with multiple features can sense and adapt to local environmental conditions. Controllers described herein can be integrated with a building management system (BMS) to greatly enhance the BMS's effectiveness at managing local environments in a building. Controllers described herein may have functionality for providing one, two, three or more of the following features: (a) powering an EC device of an EC window; (b) determining percent transmittance of an EC window; (c) determining size of an EC window; (d) determining temperature of an EC device of an EC window; (e) determining damage to an EC device of an EC window; (f) determining wire length between the EC window controller and an EC window; (g) wireless communication between the EC window controller and a separate communication node; (h) storing and transmitting data relating to an EC window via an RFID tag that is actively or passively powered; (i) storing charge resulting from a transition of an EC device of the EC window and/or direct such charge to a power grid; (j) repairing short related defects of an EC device of an EC window; and (k) heating one or both electrodes of an EC device of an EC window.

In one disclosed aspect, a window controller for controlling one or more windows capable of undergoing reversible optical transitions is configured or designed to provide at least two functions. In certain embodiments may be any two of the following: (a) powering a reversible optical transition of at least one of the one or more windows; (b) determining transmittance of at least one of the one or more windows; (c) determining a size of at least one of the one or more windows; (d) determining temperature of at least one of the one or more windows; (e) determining damage to at least one of the one or more windows; (f) determining wire length between the window controller and at least one of the one or more windows; (g) wireless communication between the window controller and a separate communication node; (h) storing and transmitting data relating to at least one of the one or more windows via an RFID tag that is actively or passively powered; (i) storing charge resulting from a transition of at least one of the one or more windows and/or direct such charge to a power grid; (j) repairing short related defects of at least one of the one or more windows; and (k) heating one or both electrodes of an electrochromic device of at least one of the one or more windows. In various embodiments, the controller is configured or designed to provide at least functions (b), (c), (d) and (e). In other embodiments, the controller is configured or designed to provide at least functions (a), (b), (c), (d) and (e). In still other embodiments, the controller is configured or designed to provide at least functions (a), (b), (d), (g), and (h).

Some disclosed aspects concern a controller as described but provided as part of a larger combination of system of elements such as a building management system containing window controller as described. In another example, an apparatus includes (i) a Building Management System (BMS); (ii) the window controller as described above; and (iii) a multistate electrochromic window. In yet another example, an apparatus includes (i) the window controller as described above, and (ii) an electrochromic window. In various embodiments, the electrochromic window is entirely solid state and inorganic.

Other disclosed aspects pertain to methods of managing a building's systems. Such methods may make use of data collected by a window controller from one or more windows capable of undergoing reversible optical transitions in the building. This data is used as input for adjusting at least one other system of the building, such as HVAC, lighting, security, power, fire suppression and elevator control. In some related methods, the controller provides power to the one or more windows to drive the reversible optical transitions. In a specific embodiment, the method includes the following operations: (a) powering the reversible optical transition of at least one of the one or more windows; (b) determining transmittance of at least one of the one or more windows; (c) determining temperature of at least one of the one or more windows; (d) wireless communication between the window controller and a separate communication node;

and (e) storing and transmitting data relating to at least one of the one or more windows via an RFID tag that is actively or passively powered.

In a specific example, the method further involves collecting one or more of the following types of data about the one or more windows: transmittance, size, temperature. In a different example, the method additionally involves storing data, in the controller, about the one or more windows.

Still other disclosed aspects pertain to window controllers for controlling one or more windows capable of undergoing reversible optical transitions, where the window controllers are configured or designed to provide the following functions: (a) powering a reversible optical transition of at least one of the one or more windows; (b) determining transmittance of at least one of the one or more windows; (c) determining temperature of at least one of the one or more windows; (d) communication between the window controller and a separate communication node; and (e) storing and transmitting data relating to at least one of the one or more windows.

In such controllers, the function of determining temperature of at least one of the one or more windows may be implemented by direct measurement from one or more sensors on the at least one window. Alternatively, the function of determining temperature of at least one of the one or more windows may be implemented by algorithmically inferring temperature from current and/or voltage information from the at least one window.

In such controllers, the function of powering the reversible optical transition may be implemented with pulse width amplifier rendered as an h-bridge or a buck converter. Additionally or alternatively, the function of determining transmittance of at least one of the one or more windows is implemented by direct measurement from one or more sensors on the at least one window. In certain embodiments, the function of storing and transmitting data relating to at least one of the one or more windows may involve reading data from a controller embedded in the at least one window.

These and other features and advantages will be described in further detail below, with reference to the associated drawings.

BRIEF DESCRIPTION OF THE DRAWINGS

The following detailed description can be more fully understood when considered in conjunction with the drawings in which.

DETAILED DESCRIPTION

Figure 1:
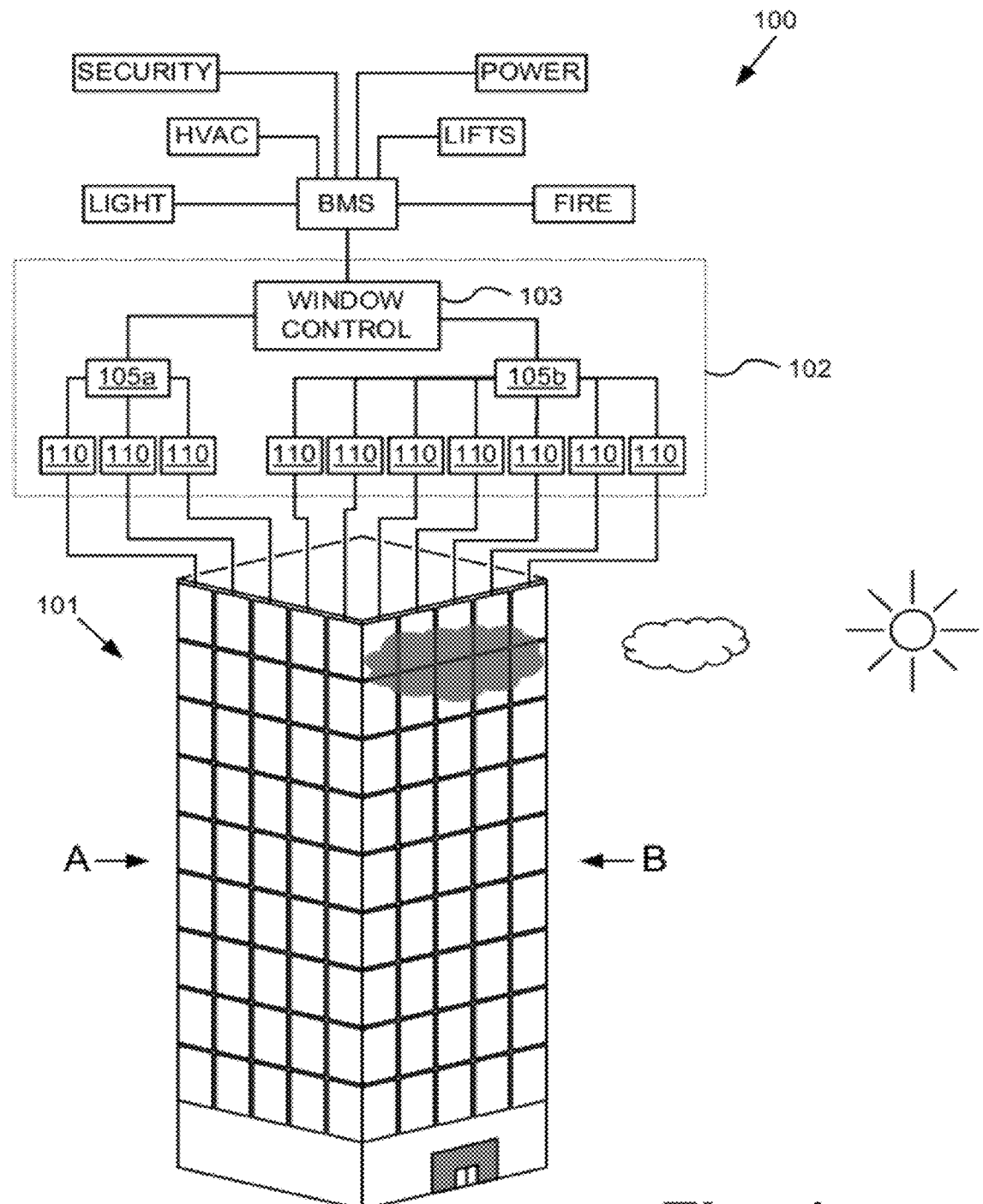
FIG. 1 depicts a an EC window controller interfaced with a building management system.

Conventional EC window controllers have a number of pitfalls. For example, they typically need to be calibrated at the factory for a specific insulated glass unit (IGU) size and wire length—any mismatch at the time of installation can cause problems. Also, conventional window controllers must be hard wired to a building management system and commands to the controller are usually entered by hand at the controller or via a BMS. Sensors on such window controllers typically have separate sensors for providing data feedback for control of the window and for supplying a BMS with data. Conventional EC window controllers also are limited in the type of data they collect from the EC window environment and how they collect such data. Controllers described herein do not suffer from such issues. Multipurpose EC window controllers described herein include features that provide easier installation, improved user interfaces, wireless communication and control, higher and consistent performance under varying conditions and capability to enhance environmental conditions, for example, when integrated into a building management system.

EC Devices

Controllers described herein are used to control EC devices, particularly in EC windows. Virtually any EC device will work with multipurpose controllers described herein. Additionally, non-electrochromic optically switchable devices such liquid crystal devices and suspended particle devices. For context, EC device technology is described below in relation to all solid state and inorganic EC devices, particularly low-defectivity all solid state and inorganic EC devices. See the discussion associated with FIG. 5. Because of their low defectivity and robust nature, these devices are particularly well suited for multipurpose controllers described herein. One embodiment is any controller described herein where the controller includes one or more EC devices selected from those described herein.

EC Windows

Electrochromic windows may use one or more EC devices and for those that use more than one EC device, more than one type of EC device can used in a window unit (IGU plus frame and/or accompanying structural support). An EC window will typically have wires or leads that extend from the bus bars of the EC device(s) through a seal in the IGU. These leads may also pass through a window frame. A window controller is wired to the leads, for example, near the EC window or not. EC windows are described in the patent applications incorporated by reference herein. Although not limited to such use, multipurpose controllers described herein find particular use with multistate EC windows, that is, windows that can transition not only between disparate states of coloring and bleaching, but also can transition to one or more intermediate colored states. Particular examples of multistate windows, having two or more EC panes, are described in U.S. patent application Ser. No. 12/851,514, filed on Aug. 5, 2010, and entitled "Multipane Electrochromic Windows," which is incorporated by reference herein for all purposes. One advantage to such multipane EC windows is that the likelihood of defects in each of the EC panes aligning perfectly, and thus being observable to the end user, is quite small. This advantage is accentuated when low-defectivity panes are used. Controllers described herein are well suited for controlling and coordinating the function of one or more EC devices, for example, in a single window.

When used in combination with EC windows that have superior performance characteristics, for example short transition times, low-defectivity, long life, uniform transitions and the like, for example, all solid state and inorganic EC windows, the window controllers described herein significantly augment environmental control in a building. This is particularly true when window controllers are integrated with a BMS. Interrelationships between window performance, microclimate sensing, and environmental control are described in more detail below.

Building Management Systems

Although not limited to this context, multipurpose controllers described herein are well suited for integration with a BMS. A BMS is a computer based control system installed in a building that monitors and controls the building's mechanical and electrical equipment such as ventilation, lighting, power systems, elevators, fire systems, and security systems including automatic door locks, alarms, turnstiles and the like. A BMS consists of hardware and associated software for maintaining conditions in the building according to preferences set by the occupants and or building manager. The software can be based on, for example, internet protocols and/or open standards.

A BMS is most common in a large building, and typically functions at least to control the environment within the building. For example, a BMS may control temperature, carbon dioxide levels and humidity within a building. Typically there are many mechanical devices that are controlled by a BMS such as heaters, air conditioners, blowers, vents, and the like. To control the building environment, a BMS may turn on and off these various devices under defined conditions. A core function of a typical modern BMS is to maintain a comfortable environment for the building's occupants while minimizing heating and cooling losses. Thus a modern BMS is used not only to monitor and control, but also to optimize the synergy between various systems, for example to conserve energy and lower building operation costs. One embodiment is a multipurpose controller as described herein, integrated with a BMS, where the multipurpose controller is configured to control one or more EC windows. In one embodiment, the one or more EC windows include at least one all solid state and inorganic EC device. In one embodiment, the one or more EC windows include only all solid state and inorganic windows. In one embodiment, the EC windows are multistate EC windows as described in U.S. patent application Ser. No. 12/851,514, filed on Aug. 5, 2010, and entitled "Multipane Electrochromic Windows."

FIG. 1 is a schematic of a BMS, 100, that manages a number of systems of a building, 101, including security systems, heating/ventilation/air conditioning (HVAC), lighting of the building, power systems, elevators, fire systems and the like. Security systems may include magnetic card access, turnstiles, solenoid driven door locks, surveillance cameras, burglar alarms, metal detectors and the like. Fire systems may include fire alarms, fire suppression systems including water plumbing control. Lighting systems may include interior lighting, exterior lighting, emergency warning lights, emergency exit signs, and emergency floor egress lighting. Power systems may include main power, backup power generators, and uninterrupted power source (UPS) grids.

Also, BMS 100 manages a window controller, 102. In this example, window controller 102 is depicted as a distributed network of window controllers including a master controller, 103, intermediate controllers, 105, and end or leaf controllers, 110. For example, master controller 103 may be in proximity to the BMS, and each floor of building 101 may have one or more intermediate controllers 105, while each window of the building has its own end controller 110. In this example, each of controllers 110 controls a specific EC window of building 101.

Each of controllers 110 can be in a separate location from the EC window that it controls, or be integrated into the EC window. For simplicity, only ten EC windows of building 101 are depicted as controlled by window controller 102. In a typical setting there may be a very large number of EC windows in a building controlled by window controller 102. Window controller 102 need not be a distributed network of window controllers, for example, a single end controller which controls the functions of a single EC window also falls within the scope of the invention. Advantages and features of incorporating multipurpose EC window controllers as described herein with BMS's are described below in more detail and in relation to FIG. 1 where appropriate.

One aspect of the invention is a BMS including a multipurpose EC window controller as described herein. By incorporating feedback from a multipurpose EC window controller, a BMS can provide, for example, enhanced: 1) environmental control, 2) energy savings, 3) security, 4) flexibility in control options, 5) improved reliability and usable life of other systems due to less reliance thereon and therefore less maintenance thereof, 6) information availability and diagnostics, 7) effective use of staff, and various combinations of these, because the EC windows can be automatically controlled. Such multipurpose controllers are described in more detail below, for example, in the context of being integrated into a BMS, however, the invention is not limited in this way. Multipurpose controllers of the invention may be stand alone controllers, for example, configured to control the functions of a single window or a plurality of EC windows, without integration into a BMS.

Multipurpose Controllers for EC Windows

Window controllers described herein have a microprocessor that controls one or more functions of one or more EC devices of an EC window. In one example, the controller regulates the potential applied to the EC device of the window and may optionally control other functions (alone or combined with other microprocessors) such as recharging a battery used to function the window, wirelessly communicating with a remote control, such as a hand held ("clicker") and/or a BMS.

Because electrochromic windows offer enhanced control of not only the amount of light that enters the interior of a building, but also can serve, for example, to keep heat in, or out, of a building by providing a superior thermal barrier, the benefits of EC windows are enhanced by multipurpose controllers described herein. This is especially true when the controllers are integrated with a BMS, for example, in a building having many EC windows. The benefits are multiplied even more when the multipurpose controllers are not only integrated into a BMS, but also are used to control the functions of multistate EC windows.

In one embodiment, the EC window controller is a multipurpose controller, that is, it can control and/or monitor a number of functions and/or characteristics of one or more EC windows. One way to enhance the capabilities of a BMS which includes an EC window controller into its systems is to have a window controller with such enhanced capabilities providing feedback to the BMS, particularly where the feedback includes a number of parameters and on a more granular, window-by-window basis. These capabilities and/or functions allow synergistic control of, for example, a building's energy requirements and thus can save money above and beyond installing EC windows in a building, with or without conventional automatic control of the windows. The more efficient and versatile the EC windows employed in such a system, the greater energy savings and environmental control. Multistate EC windows are an exemplary choice for BMS's configured with multipurpose controllers.

Embodiments described herein include multipurpose controllers that can control one or more EC devices of an EC window and also one or more functions of each EC device of the associated window. One aspect of the invention is an EC window controller that includes one, two, three or more of the following functions: (a) powering an EC device of the EC window; (b) determining percent transmittance of an EC window; (c) determining size of the EC window; (d) determining temperature of an EC device of the EC window; (e) determining damage to an EC device of the EC window; (f) determining wire length between the EC window controller and the EC window; (g) wireless communication between the EC window controller and a separate communication node; (h) storing and transmitting data relating to an EC window via an RFID tag that is actively or passively powered; (i) storing charge resulting from a transition of an EC device of the EC window and/or direct such charge to a power grid; (j) repairing short related defects of an EC device of the EC window; and (k) heating one or both electrodes of an EC device of the EC window. Each of these capabilities and functions is described in more detail below.

Powering an EC Device

In some embodiments, the multipurpose controller can power one or more EC devices in an EC window. Typically, this function of the controller is augmented with one or more other functions described in more detail below. Controllers described herein are not limited to those that have the function of powering an EC device to which it is associated for the purposes of control. That is, the power source for the EC window may be separate from the controller, where the controller has its own power source and directs application of power from the window power source to the window. However, it is convenient to include a power source to the controller and configure the controller to power the window directly, because it obviates the need for separate wiring for powering the EC window.

One embodiment is a window controller with one, two, three or more capabilities described herein, where at least one of the capabilities is to control the optical state of an EC window. In various embodiments, there are certain conditions in which current and voltage may to be individually limited, and there is an optimum sequence by which the window is controlled with current limits and/or voltage limits to ensure reasonably quick and non-damaging optical transitions (such as coloring and bleaching an electrochromic window). Examples of such sequences are disclosed in U.S. patent application, Ser. No. 13/049,623 (issued as U.S. Pat. No. 8,254,013), naming Pradhan, Mehtani, and Jack as inventors, titled "Controlling Transitions In Optically Switchable Devices" and filed on the same day as the present application, which is incorporated herein by reference in its entirety. As part of the window control process, the controller may receive measurements of current and/or voltage on a window. Once such measurements are made the "control" function may impose appropriate current and/or voltage limits to allow the window to reliability change state.

An example of powering an electrochromic window involves use of a controller having a pulse width modulated amplifier (see FIG. 3) rendered as an "h-bridge" which allows the load to float, be grounded, or be set to any voltage or polarity between the input voltage to the controller and ground. In other embodiments, an EC controller is implemented using a "buck converter" and a separate polarity switch allowing the load to set to any voltage or polarity between the input voltage to the controller and ground. Control may also include current limits during all or part of the transition from one state to another.

Percent Transmittance (% T)

Electrochromic windows have at least one EC device deposited on a glass or other transparent substrate and may have other coatings and panes that are part of an IGU in a window unit. The percent transmittance (% T) of an EC window, typically the integrated transmittance across the visible spectrum for an IGU of an EC window, is an important parameter because it is a measure of how much light is entering a room where the window is installed. When using windows with multistate capability, that is having intermediate states as well as end states of colored and bleached, it may be important to have feedback on the % T in order to maintain a particular state of transition and/or move to a new color transition according to the desire of the end user. Controllers described herein can measure % T by use of sensors and/or by using current/voltage (I/V) parameters to calculate % T.

Determining the % T can be inferred algorithmically or measured directly using a sensor (e.g. a photometric sensor such as a silicon photodiode) wired to a controller's analog input (AI-Transmittance). See FIGS. 3 and 4, discussed below. Another acceptable sensor is a pyranometer which measures solar irradiance across a larger spectrum of solar radiation.

In one embodiment, the controller includes a sensor on the outside of the building (or window side which will face outside when installed), which serves one or more EC windows and measures the solar spectrum that is entering the window or windows, and one more internal sensors which measure solar irradiance transmitted through the window of each window's IGU. These two energy values are compared in logic in the controller to provide a measure of % T of the window. When one sensor on the outside of the building (or window) is used to serve more than one window, the controller will typically sample solar irradiance on the exterior for use in calculating (effective) % T of each window unit. Sensors are calibrated to their respective IGU's, for example, when installed or replaced in the field.

In one embodiment, the controller employs an outside and an inside sensor for % T for each window. This embodiment is particularly well suited for obtaining more granular feedback on % T for adjusting individual windows' transmissivities accordingly, or for example when the window controller is integrated into a BMS, for adjusting a number of parameters of a building such as HVAC and the like. For example, referring again to FIG. 1, window controller 102 controls five EC windows on side A of building 101, and five windows on side B of building 101. These windows are depicted as being on the top floor of building 101. In this example, intermediate controller 105a controls three windows of one room of building 101, and intermediate controller 105b controls seven windows in another room, two on side A of building 101 and five on side B of building 101. In this example, there is a shadow of a cloud on side B of building 101 because a cloud is obscuring part of the sun's rays. Assuming all the EC windows are of the same size and type, each of the two windows controlled by intermediate controller 105b on side A of building 101 will have the same approximate % T, while each of the five windows controlled by intermediate controller 105b on side B of building 101 will have different % T values because each has a different percent area covered by the shadow from the cloud.

This granularity in data feedback is highly valuable in controlling the environment, for example light, heat, etc., in the room having these seven windows. Intermediate controller 105b uses the % T feedback to maintain the desired environment in the room having these seven windows. Master controller 103 uses the data from intermediate controller 105a and 105b to control the environment of both rooms. For example if the room having the EC windows controlled by intermediate controller 105b is a conference room with many people, the drop in % T due to the cloud's shadow will make the room easier to cool, or for example, lessen the power requirements for darkening the window during a slide presentation in the conference room.

Multipurpose controllers described herein include logic for using this type of feedback for adjusting parameters of the building, via a BMS, for maximizing energy savings. In this example, the energy saved in the conference room due to the shadow's cooling and darkening effects can be used for transitioning windows in the room controlled by intermediate window controller 105a, or, for example, the energy can be stored for later use in the windows in the conference room (see "Charge Storage" below).

In one embodiment, % T is inferred from the I/V characteristics of an EC device of the IGU. An IGU or a window can be characterized by the relationship between an electrical pulse sent through the device and how the device behaves before and after the pulse. For example, a direct current (DC) pulse is sent through an EC device of an IGU, and the DC voltage measured across the electrodes (TCO's) of the device as a result provides an I/V characteristic of the device. Environmental factors such as temperature or material characteristics of the device can produce non-linear I/V relationships (and cause hysteresis). Thus EC devices are tested at varying temperatures in order to create data for programming into the logic of controllers of the invention for reference when determining various characteristics of the IGU installed with the controller. In one embodiment, % T is measured in this way. For example, upon power up, the controller sends a pre-determined signal to the IGU of a window and based on the IGU's response to the signal, the % T is calculated by knowing the hysteresis curve of the EC device of the IGU. % T may also be inferred as a function of "ionic current," which can be calculated by measuring the applied current and subtracting the leakage current.

In one embodiment, the open circuit voltage ($V_{oc}$) of the EC device is measured, then an electrical pulse is applied, followed by measuring the $V_{oc}$ again. The change in the $V_{oc}$ as a result of the electrical pulse allows calculation of % T based on, for example, prior characterization of the device. In one example, the temperature of the device is measured along with $V_{oc}$ and the % T calculated based on the EC device's behavior to such pulses in previous characterization tests.

Size and Temperature of the IGU

The "temperature of an electrochromic device can be inferred algorithmically or measured directly using a sensor (e.g. a thermocouple, thermister, or RTD (resistive thermal device)). In various embodiments, such device is wired or otherwise communicatively coupled to a controller analog input (AI-EC Temperature). See FIGS. 3 and 4.

Using I/V measurements as described above, along with characterization data of the IGU, the size and temperature of the IGU can be determined by controllers described herein. For example, for each of a 20" by 20" window, a 40" by 40" window and a 60" by 60" window, data is collected based on UV measurements at a number of temperatures. This data is programmed into a window controller which has distinct capabilities and functions with respect to these three window sizes. In the field, during installation, an installer connects the window controller so programmed with an EC window. The controller sends an electrical pulse through the IGU of the window and from the current response, and correlating with the programmed data, the controller can determine the size and temperature of the window. This information is used, for example, to program the controller's logic according to the appropriate window size so that, for example, the appropriate power is used to transition the window during operation.

Damage to the EC Device

In one embodiment, window controllers described herein use I/V characteristics such as those described above to determine damage to an EC device in an IGU of an EC. For example, given the characterized leakage current of the EC device programmed into the controller's logic, when the controller pings the IGU for I/V feedback, this data can be compared to the data for that IGU from the factory and/or when installed. If the leakage current is greater than it was at installation, then damage to the IGU is likely. The larger the change in I/V characteristics, the more likely damage has occurred to the EC device of the IGU. For example, if the window is damaged by an object hitting the window, controllers described herein would detect the damage (for example a large electrical short) as described and, for example, alert the appropriate repair or security personnel via a BMS. In another example, over time, a number of defects arise in the EC device of an IGU which results in a change in I/V characteristics of the window. This data is fed back to an end user and/or a BMS to inform the appropriate personnel that the IGU needs to be replaced or repaired (see "In Field Short-Related Defect Repair" below).

Wire Length: Ranging

Controllers described herein may have the logic and associated hardware to determine the length of wire between a window and the controller. For example, the controller may apply an electrical signal to the wiring that leads to the one or more IGU's that they control and then measure the change in frequency in the line transmission of the signal. This change in frequency is used to determine the length of the wiring or "range" between the controller and the IGU. Knowing the length of the wiring can be important because the amount of power provided by the source is dependent on how much wiring the power must traverse, as there is a power drop off associated with resistance in the wire. The power source may need to adjust the amount of power it sends to power windows separated from it by differing lengths of wire.

Ranging is typically done between an end controller and an associated IGU in a window. Ranging can be done either actively or passively. In active ranging, the EC device of the IGU is active and can reply to a signal from the controller. In passive ranging, the EC device is switched out of the circuit while ranging is performed.

In certain implementations, a relay is provided at the IGU end of the wire, typically embedded in the IGU secondary seal. The controller sends a message down IGU power lines (using, e.g., MAXIM's OneWire interface, see www.maxim-ic.com/products/1-wire/flash/overview/index.cfm (incorporated by reference)), and the IGU then switches itself out of the circuit for a finite time period to allow the controller to conduct a ranging test. At some predefined time interval the IGU would then switch itself back into the circuit and allow normal control of the IGU to resume.

In some embodiments, the controller is located in or very near the window frame, and thus ranging is not necessary as all end controllers have the same length of wiring between them and their respective IGU's.

Wireless or Wired Communication

In some embodiments, window controllers described herein include components for wired or wireless communication between the window controller and separate communication node. Wireless or wired communications may be accomplished with a communication interface that interfaces directly with the window controller. Such interface could be native to the microprocessor or provided via additional circuitry enabling these functions.

A separate communication node for wireless communications can be, for example, another wireless window controller, an end, intermediate or master window controller, a remote control device, or a BMS. Wireless communication is used in the window controller for at least one of the following operations: programming and/or operating the EC window, collecting data from the EC window from the various sensors and protocols described herein, and using the EC window as a relay point for wireless communication. Data collected from EC windows also may include count data such as number of times an EC device has been activated, efficiency of the EC device over time, and the like. Each of these wireless communication features is described in more detail below.

In one embodiment, wireless communication is used to operate the associated EC windows, for example, via an infrared (IR), and/or radio frequency (Rf) signal. In certain embodiments, the controller will include a wireless protocol chip, such as Bluetooth, EnOcean, WiFi, Zigbee, and the like. Window controllers may also have wireless communication via a network. Input to the window controller can be manually input by a user, either directly or via wireless communication, or the input can be from a BMS of a building of which the EC window is a component.

In one embodiment, when the window controller is part of a distributed network of controllers, wireless communication is used to transfer data to and from each of a plurality of EC windows via the distributed network of controllers, each having wireless communication components. For example, referring again to FIG. 1, master window controller 103, communicates wirelessly with each of intermediate controllers 105, which in turn communicate wirelessly with end controllers 110, each associated with an EC window. Master controller 103 may also communicate wirelessly with the BMS. In one embodiment, at least one level of communication in the window controller is performed wirelessly.

In some embodiments, more than one mode of wireless communication is used in the window controller distributed network. For example, a master window controller may communicate wirelessly to intermediate controllers via WiFi or Zigbee, while the intermediate controllers communicate with end controllers via Bluetooth, Zigbee, EnOcean or other protocol. In another example, window controllers have redundant wireless communication systems for flexibility in end user choices for wireless communication.

Wireless communication between, for example, master and/or intermediate window controllers and end window controllers offers the advantage of obviating the installation of hard communication lines. This is also true for wireless communication between window controllers and BMS. In one aspect, wireless communication in these roles is useful for data transfer to and from EC windows for operating the window and providing data to, for example, a BMS for optimizing the environment and energy savings in a building. Window location data as well as feedback from sensors are synergized for such optimization. For example, granular level (window-by-window) microclimate information is fed to a BMS in order to optimize the building's various environments.

A BMS may also collect data on how many times an EC device is powered and the like for higher level feedback to vendors, for example, on quality control and reliability of the windows installed in the building. However, there are other advantages for such wireless communications. For example, since EC window control and data transfer does not require a large amount of bandwidth, having a distributed network of wirelessly linked windows and controllers offers a very useful opportunity to use the network for other purposes. In one embodiment, the wireless window controller network is used for relaying other, non-EC window related information within a building. Zigbee, for example, uses the window controller to build a mesh network, with other window controllers or other devices like dimmable ballasts, alarm systems, etc. that also employ Zigbee. As such network traffic passing through the window controller may not be related to window control at all, the window controller is simply improving the mesh reliability.

Radio Frequency Identification

Radio-frequency identification (RFID) involves interrogators (or readers), and tags (or labels). RFID tags use communication via electromagnetic waves (typically radio frequency) to exchange data between a terminal and an object, for example, for the purpose of identification and tracking of the object. Some RFID tags can be read from several meters away and beyond the line of sight of the reader.

Most RFID tags contain at least two parts. One is an integrated circuit for storing and processing information, modulating and demodulating a radio-frequency (Rf) signal, and other specialized functions. The other is an antenna for receiving and transmitting the signal.

There are three types of conventional RFID tags: passive RFID tags, which have no power source and require an external electromagnetic field to initiate a signal transmission, active RFID tags, which contain a battery and can transmit signals once a reader has been successfully identified, and battery assisted passive (BAP) RFID tags, which require an external source to wake up but have significant higher forward link capability providing greater range. RFID has many applications; for example, it may be used in enterprise supply chain management to improve the efficiency of EC device inventory tracking and management.

One embodiment is a window controller as described herein including an RFID tag. In one embodiment, the window controller is an end controller associated with a particular IGU. In one embodiment, the RFID tag may be installed on the IGU prior to installation of the window controller, that is, after the IGU and window controller are wired together, the RFID tag is considered part of the window controller. The RFID tag may be active, passive or BAP, depending on the controller's capability to power the RFID. An RFID tag in a window controller as described herein may contain at least one of the following types of data: warranty information, installation information, vendor information, batch/inventory information, EC device/IGU characteristics, customer information, manufactured date, window size, and specific parameters to be used for a particular window Such RFID tags obviate the need for stickers on IGU's or windows with such information and some RFID's have rudimentary processing capability such as keeping track of how many times an associated EC device has been activated. An unsophisticated BMS can use such information for environmental control, for example, based on known performance of EC devices as a function of usage. In another example, an installer can use a portable reader to decide which end controller to install in a particular window and/or the controller itself may read the RFID tag and program itself prior to, or upon wiring, to the IGU.

In related embodiments, a controller could also read data from the IGU that has an embedded (e.g. part of a wiring harness, or encapsulated by the secondary seal, etc.) but physically separate RFID tag, EEPROM or FLASH memory chip that would allow various details of the window to be stored with one of these storage devices. Examples of information that may be stored on the tag or memory device embedded in the IGU include warranty information, installation information, vendor information, batch/inventory information, EC device/IGU characteristics, an EC device cycle count, customer information, manufactured date, and window size.

Charge Storage

The amount of ions held in the counter electrode layer during the bleached state (and correspondingly in the EC layer during the colored state) and available to drive the EC transition depends on the composition of the layers as well as the thickness of the layers and the fabrication method. Both the EC layer and the counter electrode layer are capable of supplying charge (in the form of lithium ions and electrons) in the neighborhood of several tens of millicoulombs per square centimeter of layer surface area. The charge capacity of an EC film is the amount of charge that can be loaded and unloaded reversibly per unit area and unit thickness of the film by applying an external voltage or potential. In some embodiments, window controllers have the capability of storing charge that is produced when an associated EC device undergoes a transition that produces a charge. In other embodiments, the charged produced by the EC window transitions is diverted to a power grid. The charge is then reused, for example, for further transitions of EC windows or, for example where a BMS is integrated with the window controller, for other needs in a building where appropriate. Although the charge produced by an EC window's reverse transition is not large, the charge can be stored in, for example, a battery or sent to a grid where collectively they can be reused, for example, for further window operations including transitions.

Figure 2:
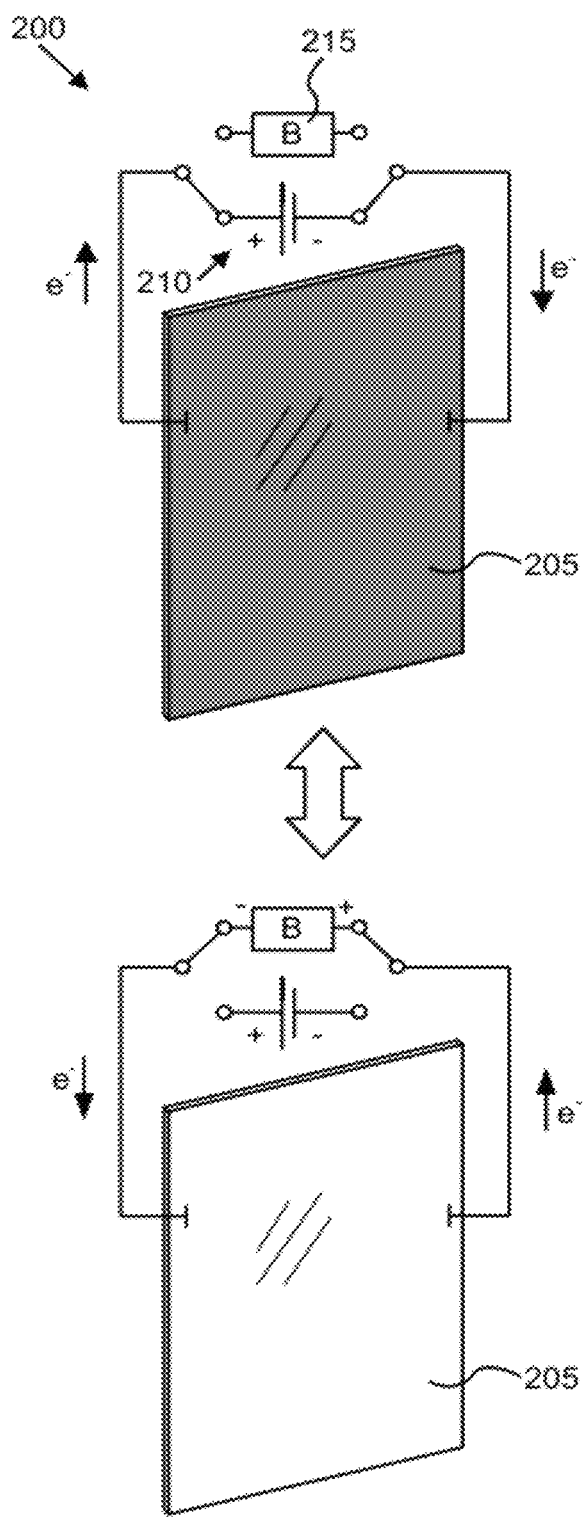
FIG. 2 is a schematic representation of a charge storage mechanism of controllers described herein.

FIG. 2 depicts a circuit, 200, where an IGU, 205, including an EC device, is powered via a source, 210. In accord with embodiments described herein, source 210 could be part of the window controller, or not. In this example, when power is supplied to the EC device of IGU 205, the EC device transitions to a colored state as depicted in the top portion of FIG. 2. Circuit 200 also includes a charge storage device, 215. Device 215 may be a capacitor or battery, for example. As depicted at the bottom of FIG. 2, when the EC device transitions from colored to bleached, upon discontinuing application of power from source 210, the circuit is reconfigured, for example using double pole switches, to send the resultant charge that the EC device creates into charge storage device 215. This stored charge may be used to power further transitions of the EC device in IGU 205, or to power other aspects of the window controller such as electrical pulses for I/V measurements, ranging pulses and the like. In one embodiment, charge from an EC device's transition is sent to a power grid for combination with other charge from other window's transitions for use in the EC window system or for other purposes. By reusing charge created from the transition of EC windows, the energy efficiency of the windows is enhanced because this charge is not simply wasted by discharging it to ground.

In Field Short-Related Defect Repair ("AC Zap")

As discussed above, EC devices can develop short circuit defects between oppositely charged conductive layers, for example, when a conductive particle makes contact with each of two conductive and electrically charged layers. When a short circuit occurs, electrons rather than ions migrate between the EC layer and the counter electrode, typically resulting in bright spots or halos at the location of, and surrounding, the electrical short when the EC device is otherwise in the colored state. Over time, some EC windows can develop many such electrical shorts and thus degrade in performance due to a significant increase in the leakage current and the appearance of many such bright spots. In certain embodiments, multipurpose window controllers have the capability to repair short related defects in associated EC devices. This has the great advantage of repairing the IGU rather than replacing it, and repairing the IGU without removing it from the window unit.

In one embodiment, the window controller repairs short related defects in the EC device by sending a high voltage alternating current (AC) through the EC device for a period of time. While not wishing to be bound to theory, it is believed that this repairs the short related defects because during application of the AC current, the frequency of the AC current does not allow ions to move across the EC stack materials, but current does flow, especially through the short related defects. The device does not transition during the application of AC current and therefore is protected from damage, while the high AC current "overloads" the shorts and burns them out, effectively sealing the short related defect areas from further current leakage. This method of in situ repair of short related defects is described in U.S. patent application Ser. No. 12/336,466, naming McMeeking as inventor, and filed on Dec. 16, 2008, which is incorporated herein by reference in its entirety.

Window (Resistive) Heating

The electrode layers of EC devices can be used for resistive heating, for example, by passing a current through one of the electrodes and thus using it as a resistive heating element. In one embodiment, the window controller includes the function of heating one or both electrodes of an EC device of the EC window for resistive heating. Resistive heating is useful for controlling the temperature of IGU for thermal barrier, to defrost the IGU and to control the temperature of the EC device to aid transitions. In one embodiment, window controllers described herein can alternate between transitioning the device and heating the device to aid in transitions. One embodiment is an apparatus including a multipurpose EC window controller as described herein and an EC window where at least one transparent conductive oxide layer of an electrochromic device of the EC window is configured to be heated independently of operation of the EC device.

Examples of Smart Controllers

The above described features of a smart controller may used alone or in combination with one another. A few specific embodiments will now be described. In one embodiment, the following functions are combined in a single smart controller: (i) powering one or more smart windows, (ii) determining a percent transmittance of the one or more smart windows (at any particular instance in time), (iii) determining the temperature of the one or more smart windows (at any particular instance in time), (iv) providing a communications interface for communicating with the one or more smart windows, and (v) reading data from physically separate memory devices or tags embedded in IGUs associated with the one or more smart windows.

In the embodiment just outlined, the powering a smart window may be accomplished using pulse width modulated amplifier rendered as, for example, an "h-bridge" allowing the window load to float, be grounded, or be set to any voltage or polarity between the input voltage to the controller and ground. The powering function could also be realized using a "buck converter" and a separate polarity switch allowing the load to set to any voltage or polarity between the input voltage to the controller and ground. Control may also include current limits during all or part of the transition from one state to another.

Determining the "percent transmittance" can be could be inferred algorithmically or measured directly using a sensor (e.g. a silicon photo diode) communicating by a wired or wireless interface to an analog input (AI-Transmittance) of the controller. See FIGS. 3 and 4, for example. Determining the "temperature of an electrochromic device" can be inferred algorithmically or measured directly using a sensor (e.g. a thermocouple, thermister, or RTD) communicating by wireless or wired interface to an analog input (AI-EC Temperature) of the controller. See FIGS. 3 and 4, for example. Wireless and/or wired communications may be accomplished using a communication interface that interfaces directly with the smart controller. This may be native to the controller's microprocessor or additional circuitry enabling these functions. Finally, the exemplary smart controller may read data from an embedded memory devices or tags in the smart windows. Such devices or tags may be part of a wiring harness, encapsulated by the secondary seal, etc. but physically separate from the smart controller. Examples of such devices or tags include RFID tag, EEPROM or FLASH memory chips that would allow all storage of various information about the windows including temperature, number of cycles, manufacturing date, etc.

In another embodiment, the following functions are combined in a single smart controller: (i) powering one or more smart windows, (ii) determining a percent transmittance of the one or more smart windows (at any particular instance in time), (iii) determining the size of one or more windows, (iv) measuring the temperature of the one or more smart windows (at any particular instance in time), (v) determining if damage to the window has occurred (evolved defects), (vi) providing a communications interface for communicating with the one or more smart windows, and (vii) reading data from physically separate memory devices or tags embedded in IGUs associated with the one or more smart windows.

In the embodiment just outlined, the powering a smart window may be accomplished using pulse width modulated amplifier (either h-bridge or buck) as outlined in the previous embodiment but now combined with sensors to simultaneously measure current and voltage delivered to the EC window. Transmittance may be determined algorithmically using a single photo sensor, knowledge of the real-time voltage and current values as the window transitions state and measuring the actual EC window temperature with a sensor in direct contact with the EC coating. Furthermore, direct knowledge of the voltage and current profiles together with measurement of the EC window temperature allows algorithmic determination of the window dimensions. The voltage and current sensing capability allows the controller to compare the current readings against historic values stored in the controller, or conveyed and retrieved via communication with the BMS, to determine if damage to the EC coating has occurred.

In yet another embodiment, a controller is designed or configured to perform the following functions: (i) powering a reversible optical transition of one or more windows; (ii) determining the transmittance of the one or more windows; (iii) determining the temperature of the one or more windows; and (iv) storing and transmitting data relating to the one or more windows via an RFID tag or via memory. A separate implementation provides a controller designed or configured to perform the following functions: (i) powering a reversible optical transition of one or more windows; (ii) determining the size(s) of the one or more windows; (iii) determining the temperature of the one or more windows; (iv) communicating between the controller and a separate communication node; and (v) storing and transmitting data relating to the one or more windows via an RFID tag or via memory. Yet another controller is designed or configured to perform the following combination of functions: (i) powering a reversible optical transition of one or more windows; (ii) determining the transmittance of the one or more windows; (iii) determining the size(s) of the one or more windows; (iv) determining the temperature of the one or more windows; (v) determining damage to the one or more windows; (vi) determining a wire length between the window controller and the one or more windows; (vii) communicating between the window controller and a separate communication node; (viii) storing and transmitting data relating to the one or more windows via an RFID tag or via memory; and (ix) repairing short related defects of the one or more windows. In these examples, as well as others given herein, when a controller interfaces with more than one window, the recited functions can apply to any one of the controlled windows, or any combination of these windows, or all of the windows.

Another controller is designed or configured to perform the following functions: (i) powering a reversible optical transition of one or more windows; (ii) determining temperature of the one or more windows; and (iii) heating a device on the one or more windows. The heated device may be the electrochromic devices themselves or a separate device formed on the windows. This embodiment is particularly appropriate for cold weather climates when it is desirable to include relatively large windows. It permits the windows to operate in a relatively untinted state when the flux of solar radiation is sufficient. The additional heating permitted by function (iii) permits use of larger window panes in areas where insulated walls are typically expected in place of large windows.

Examples of Controller Architectures

Figure 3:
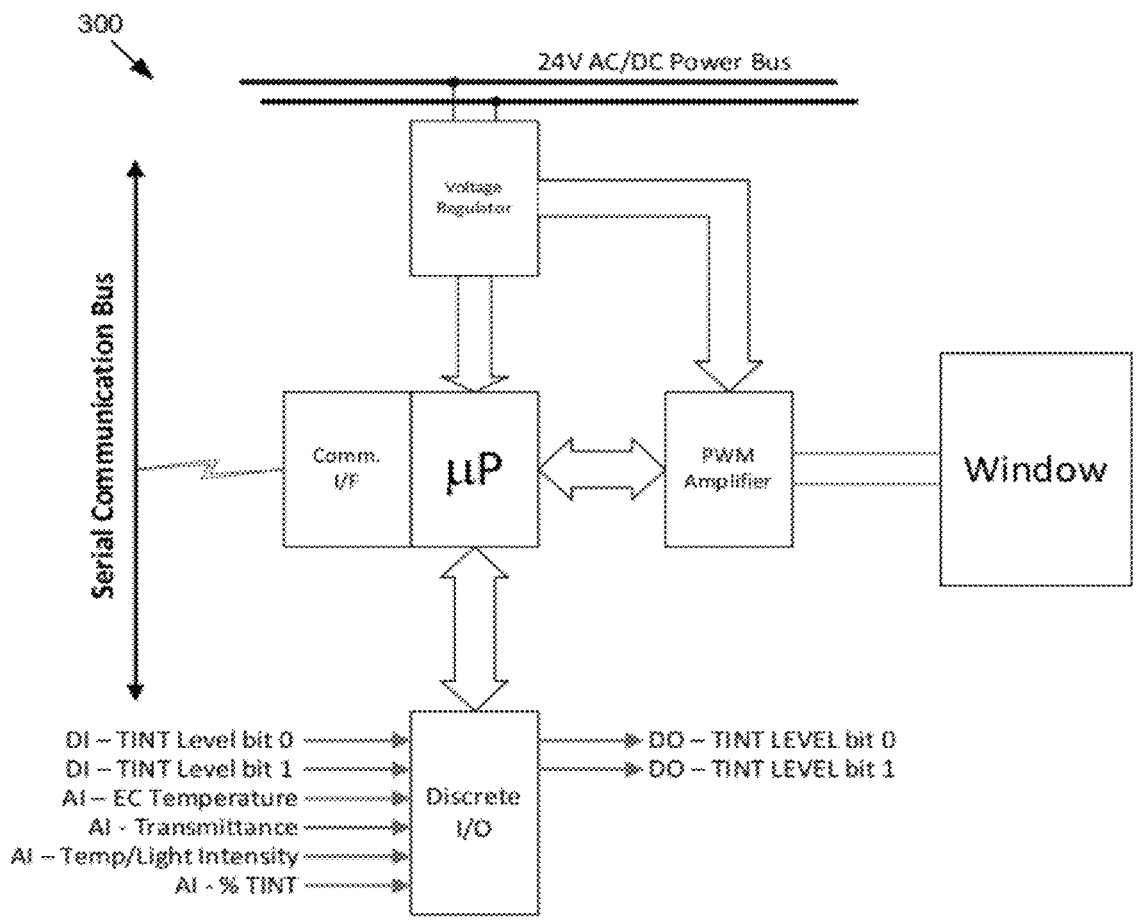
FIG. 3 is a schematic of an onboard window controller.

FIG. 3 is a schematic depiction of a window controller configuration, 300, including an interface for integrating smart windows into, for example, a residential system or a building management system. Such controller may serve as a smart controller of the type herein described or it may serve to provide "local" information from a smart window indirectly controlled by a smart controller. The disclosed embodiment may be implemented in a controller embedded in an IGU, for example. Such controllers are sometimes referred to as "onboard" controllers and are described in more detail in U.S. patent application Ser. No. 13/049,750 (issued as U.S. Pat. No. 8,213,074), titled "Onboard Controller for Multistate Windows" and filed on the same day as the present application, which is incorporated herein by reference in its entirety.

In the depiction of FIG. 3, a voltage regulator accepts power from a standard 24 v AC/DC source. The voltage regulator is used to power a microprocessor (µP) as well as a pulse width modulated (PWM) amplifier which can generate current at high and low output levels, for example, to power an associated smart window. A communications interface allows, for example, wireless communication with the controller's microprocessor. In one embodiment, the communication interface is based on established interface standards, for example, in one embodiment the controller's communication interface uses a serial communication bus which may be the CAN 2.0 physical layer standard introduced by Bosch and widely used today in automotive and industrial applications. "CAN" is a linear bus topology allowing for 64 nodes (window controllers) per network, with data rates of 10 kbps to 1 Mbps, and distances of up to 2500 m. Other hard wired embodiments include MODBUS, LonWorks™, power over Ethernet, BACnet MS/TP, etc. The bus could also employ wireless technology (e.g. Zigbee, Bluetooth, etc.).

In the depicted embodiment, the controller includes a discrete input/output (DIO) function, where a number of inputs, digital and/or analog, are received, for example, tint levels, temperature of EC device(s), % transmittance, device temperature (for example from a thermistor), light intensity (for example from a LUX sensor) and the like. Output includes tint levels for the EC device(s). The configuration depicted in FIG. 3 is particularly useful for automated systems, for example, where an advanced BMS is used in conjunction with EC windows having EC controllers as described herein. For example, the bus can be used for communication between a BMS gateway and the EC window controller communication interface. The BMS gateway also communicates with a BMS server.

Some of the functions of the discrete I/O will now be described.

DI-TINT Level bit 0 and DI-TNT Level bit 1: These two inputs together make a binary input (2 bits or $2^2=4$ combinations; 00, 01, 10 and 11) to allow an external device (switch or relay contacts) to select one of the four discrete tint states for each EC window pane of an IGU. In other words, this embodiment assumes that the EC device on a window pane has four separate tint states that can be set. For IGUs containing two window panes, each with its own four-state TINT Level, there may be as many as eight combinations of binary input. See U.S. patent application Ser. No. 12/851,514, filed on Aug. 5, 2010 and previously incorporated by reference. In some embodiments, these inputs allow users to override the BMS controls (e.g. untint a window for more light even though the BMS wants it tinted to reduce heat gain).

AI-EC Temperature: This analog input allows a sensor (thermocouple, thermister, RTD) to be connected directly to the controller for the purpose of determining the temperature of the EC coating. Thus temperature can be determined directly without measuring current and/or voltage at the window. This allows the controller to set the voltage and current parameters of the controller output, as appropriate for the temperature.

AI-Transmittance: This analog input allows the controller to measure percent transmittance of the EC coating directly. This is useful for the purpose of matching multiple windows that might be adjacent to each other to ensure consistent visual appearance, or it can be used to determine the actual state of the window when the control algorithm needs to make a correction or state change. Using this analog input, the transmittance can be measured directly without inferring transmittance using voltage and current feedback.

AI-Temp/Light Intensity: This analog input is connected to an interior room or exterior (to the building) light level or temperature sensor. This input may be used to control the desired state of the EC coating several ways including the following: using exterior light levels, tint the window (e.g. bright outside, tint the window or vice versa); using and exterior temperature sensor, tint the window (e.g. cold outside day in Minneapolis, untint the window to induce heat gain into the room or vice versa, warm day in Phoenix, tint the widow to lower heat gain and reduce air conditioning load).

AI-% Tint: This analog input may be used to interface to legacy BMS or other devices using 0-10 volt signaling to tell the window controller what tint level it should take. The controller may choose to attempt to continuously tint the window (shades of tint proportionate to the 0-10 volt signal, zero volts being fully untinted, 10 volts being fully tinted) or to quantize the signal (0-0.99 volt means untint the window, 1-2.99 volts means tint the window 5%, 3-4.99 volts equals 40% tint, and above 5 volts is fully tinted). When a signal is present on this interface it can still be overridden by a command on the serial communication bus instructing a different value.

DO-TINT LEVEL bit 0 and bit 1: This digital input is similar to DI-TINT Level bit 0 and DI-TNT Level bit 1. Above, these are digital outputs indicating which of the four states of tint a window is in, or being commanded to. For example if a window were fully tinted and a user walks into a room and wants them clear, the user could depress one of the switches mentioned and cause the controller to begin untinting the window. Since this transition is not instantaneous these digital outputs will be alternately turned on and off signaling a change in process and then held at a fixed state when the window reaches its commanded value.

Figure 4:
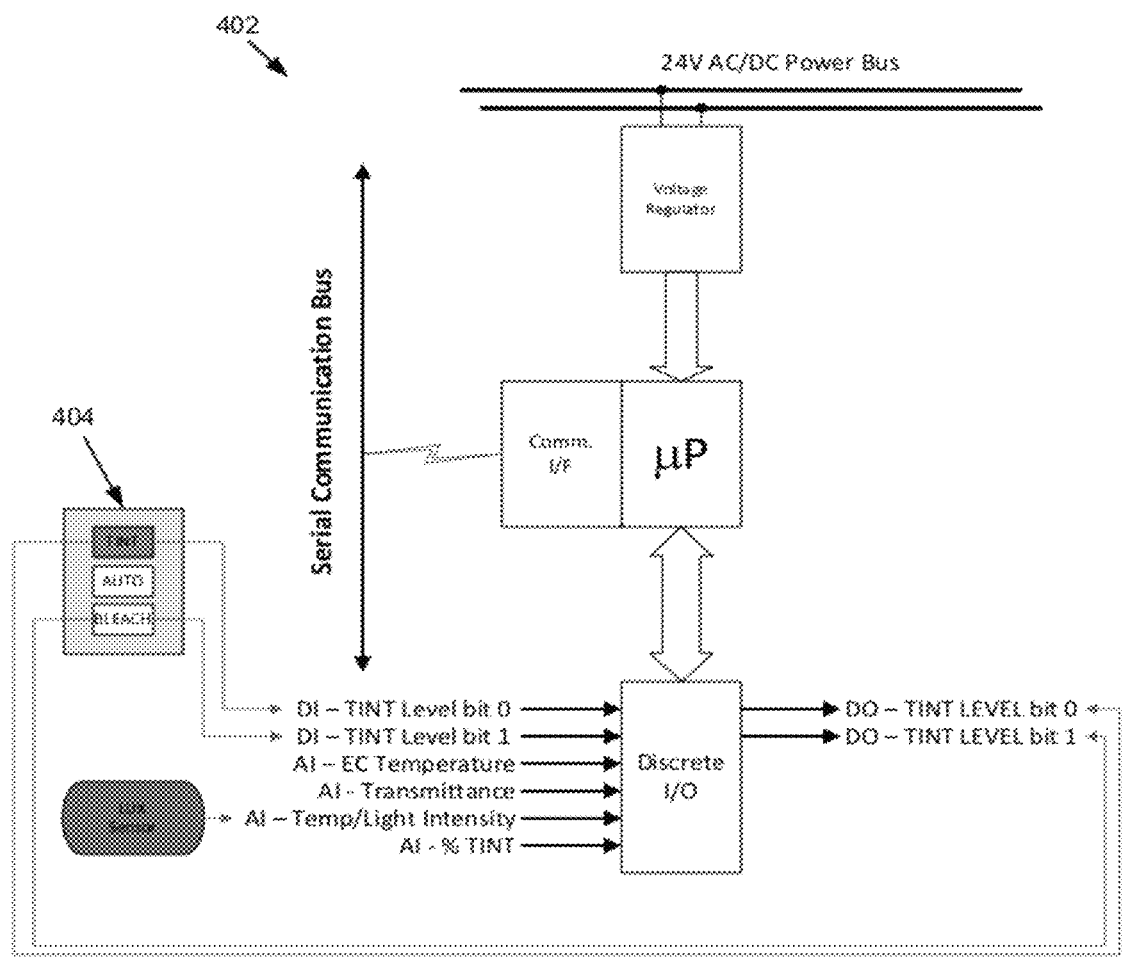
FIG. 4 depicts a different onboard window controller and associated user interface.

FIG. 4 depicts a controller configuration 402 having a user interface. For example where automation is not required, the EC window controller, for example as depicted in FIG. 3, can be populated without the PWM components and function as I/O controller for an end user where, for example, a keypad, 404, or other user controlled interface is available to the end user to control the EC window functions. The EC window controller and optionally I/O controllers can be daisy chained together to create networks of EC windows, for automated and non-automated EC window applications.

In certain embodiments, the controller 402 does not directly control a window but may indirectly control one or more windows. The controller may direct or coordinate the operation of one or more other controllers such as controllers 103 and/or 105 in FIG. 1.

Solid-State and Inorganic EC Devices

A description of EC devices is provided for context, because window controllers described herein include functions that use features of EC devices, for example, in order to measure parameters such as temperature, window size, percent transmission and the like, as well as using EC devices in a non-conventional sense, for example, using an electrode of an EC device for resistive heating. Thus structure and function of EC devices is described in the context of solid-state and inorganic EC devices, although controllers described herein can control any EC device. Further, as noted above, such controllers may be used with windows having non-electrochromic optically switchable devices such as liquid crystal devices and suspended particle devices.

Figure 5:
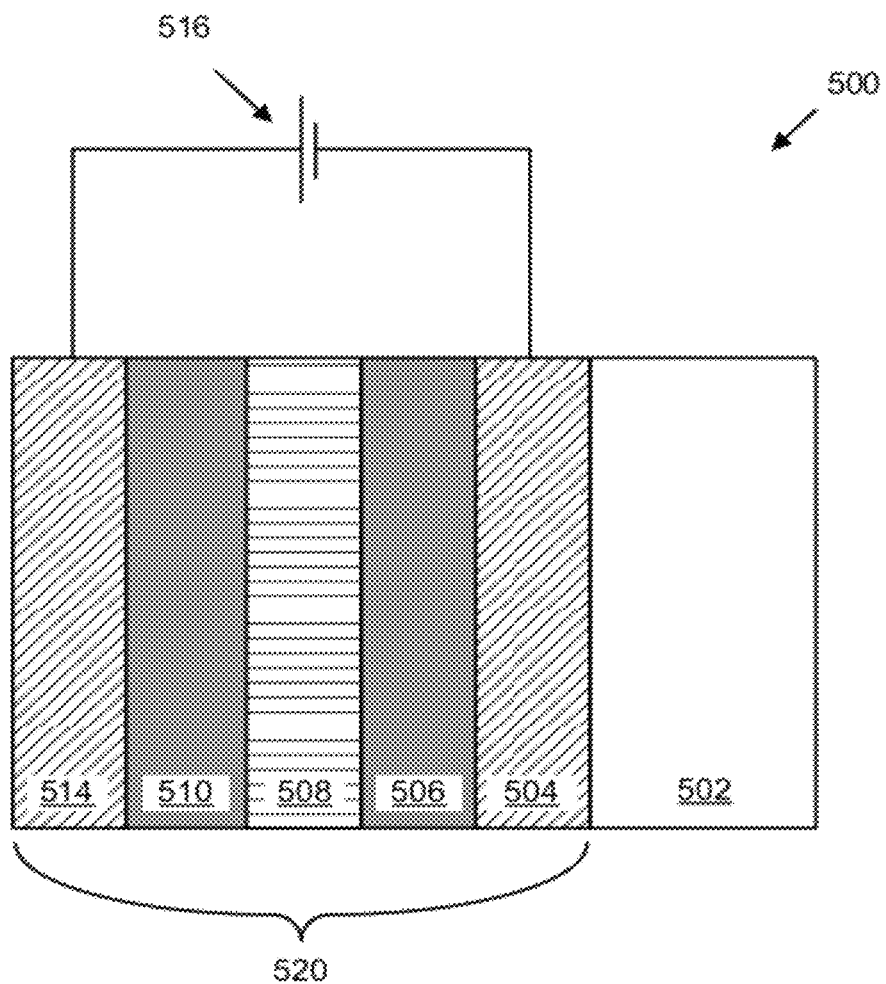
FIG. 5 is a cross section schematic of an all solid state and inorganic EC device on a substrate.

FIG. 5 depicts a schematic cross-section of an EC device, 500. Electrochromic device 500 includes a substrate, 502, a conductive layer (CL), 504, an EC layer (EC), 506, an ion conducting layer (IC), 508, a counter electrode layer (CE), 510, and a conductive layer (CL), 514. Layers 504, 506, 508, 510, and 514 are collectively referred to as an EC stack, 520. A voltage source, 516, operable to apply an electric potential across EC stack 520, effects the transition of the EC device from, for example, a bleached state to a colored state (depicted). The order of layers can be reversed with respect to the substrate. The EC device 500 may include one or more additional layers (not shown) such as one or more passive layers. Passive layers used to improve certain optical properties may be included in EC device 500. Passive layers for providing moisture or scratch resistance may also be included in the EC device 500. For example, the conductive layers may be treated with anti-reflective or protective oxide or nitride layers. Other passive layers may serve to hermetically seal the EC device 500.

Such all solid-state and inorganic EC devices, methods of fabricating them, and defectivity criterion are described in more detail in U.S. patent application Ser. No. 12/645,111, entitled, "Fabrication of Low-Defectivity Electrochromic Devices," filed on Dec. 22, 2009 and naming Mark Kozlowski et al. as inventors, and in U.S. patent application Ser. No. 12/645,159, entitled, "Electrochromic Devices," filed on Dec. 22, 2009 and naming Zhongchun Wang et al. as inventors, both of which are incorporated by reference herein for all purposes. In accordance with certain embodiments, EC devices where the counter electrode and EC electrodes are formed immediately adjacent one another, sometimes in direct contact, without separately depositing an ionically conducting layer, are used with controllers described herein. Such devices, and methods of fabricating them, are described in U.S. patent application Ser. Nos. 12/772,055 and 12/772,075, each filed on Apr. 30, 2010, and in U.S. patent application Ser. Nos. 12/814,277 and 12/814,279, each filed on Jun. 11, 2010—each of the four applications is entitled "Electrochromic Devices," each names Zhongchun Wang et al. as inventors, and each is incorporated by reference herein in their entireties. These devices do not have an IC layer per se, but function as if they do.

It should be understood that the reference to a transition between a bleached state and colored state is non-limiting and suggests only one example, among many, of an EC transition that may be implemented. The term "bleached" refers to an optically neutral state, for example, uncolored, transparent or translucent. Still further, unless specified otherwise herein, the "color" of an EC transition is not limited to any particular wavelength or range of wavelengths. In the bleached state, a potential is applied to the EC stack 520 such that available ions in the stack that can cause the EC material 506 to be in the colored state reside primarily in the counter electrode 510. When the potential on the EC stack is reversed, the ions are transported across the ion conducting layer 508 to the EC material 506 and cause the material to enter the colored state.

In this example, the materials making up EC stack 520 are both inorganic and solid state. Because organic materials tend to degrade over time, inorganic materials offer the advantage of a reliable EC stack that can function for extended periods of time. Materials in the solid state also offer the advantage of not having containment and leakage issues, as materials in the liquid state often do. One embodiment is an apparatus including a controller as described herein and an EC device that is all solid state and inorganic.

Referring again to FIG. 5, voltage source 516 is typically a low voltage electrical source and may be configured in multipurpose controllers to operate in conjunction with other components such as sensors, RFID tags, and the like. In certain embodiments, multipurpose controllers described herein include the capability to supply power to an EC device, for example, as voltage source 516.

A typical substrate 502 is glass. Suitable glasses include either clear or tinted soda lime glass, including soda lime float glass. Typically, there is a sodium diffusion barrier layer (not shown) between substrate 502 and conductive layer 504 to prevent the diffusion of sodium ions from the glass into conductive layer 504.

On top of substrate 502 is conductive layer 504. Conductive layers 504 and 514 may be made from a number of different materials, including conductive oxides, thin metallic coatings, conductive metal nitrides, and composite conductors. Typically, conductive layers 504 and 514 are transparent at least in the range of wavelengths where electrochromism is exhibited by the EC layer. Transparent conductive oxides include metal oxides and metal oxides doped with one or more metals. Since oxides are often used for these layers, they are sometimes referred to as "transparent conductive oxide" (TCO) layers.

The function of the TCO layers is to spread an electric potential provided by voltage source 516 over surfaces of the EC stack 520 to interior regions of the stack, with very little ohmic potential drop. The electric potential is transferred to the conductive layers though electrical connections to the conductive layers. Typically, bus bars, one in contact with conductive layer 504 and one in contact with conductive layer 514, provide the electric connection between the voltage source 516 and the conductive layers 504 and 514. Generally, various thicknesses of the layers of the conductive material may be employed so long as they provide the necessary electrical properties (for example, conductivity) and optical properties (for example, transmittance). Typically, the conductive layers 504 and 514 are as thin as possible to increase transparency and to reduce cost. Preferably, the thickness of the each conductive layer 504 and 514 is also substantially uniform.

The sheet resistance ($R_s$) of the conductive layers is also important because of the relatively large area spanned by the layers, for example, when the device is part of an electrochromic window. The sheet resistance of conductive layers 504 and 514 may be between about 5 Ohms per square to about 30 Ohms per square. In general, it is desirable that the sheet resistance of each of the two conductive layers be about the same. The conductive layers can be exploited for resistive heating of the device, by virtue of their sheet resistance, rather than for functioning the EC device of which they are a part. In one embodiment, multipurpose controllers described include the function of resistive heating using one or more conductive layers of an EC device. Such resistive heating as described in more detail below.

Overlaying conductive layer 504 is EC layer 506. The EC layer may contain any one or more of a number of different EC materials, including metal oxides. An EC layer 506 including a metal oxide is capable of receiving ions transferred from counter electrode layer 510. The thickness of the EC layer 506 depends on the EC material selected for the EC layer. The EC layer 506 may be about 50 nm to 2,000 nm thick.

An ion conducting layer 508 overlays EC layer 506. Any suitable material may be used for the ion conducting layer 508 provided it allows for the passage of ions between the counter electrode layer 510 to the EC layer 506 while substantially preventing the passage of electrons.

On top of ion conducting layer 508 is counter electrode layer 510. The counter electrode layer may include one or more of a number of different materials that are capable of serving as reservoirs of ions when the EC device is in the bleached state. During an EC transition initiated by, for example, application of an appropriate electric potential, the counter electrode layer transfers some or all of the ions it holds to the EC layer, via the IC layer, changing the EC layer to the colored state. Concurrently, in the case of nickel tungsten oxide (NiWO), the counter electrode layer colors with the loss of ions. Because counter electrode layer 510 contains the ions used to produce the EC phenomenon in the EC material when the EC material is in the bleached state, the counter electrode preferably has high transmittance and a neutral color when it holds significant quantities of these ions. When charge is removed from a counter electrode 510 made of NiWO (that is, ions are transported from the counter electrode 510 to the EC layer 506), the counter electrode layer will turn from a transparent state to a brown colored state. Thus when potential is applied to an electrochromic device, an optical transition occurs. Likewise, when an EC device transitions in the other direction, it behaves as a battery, and produces an electrical charge by virtue of the ions traversing the IC layer in the opposite direction, current flows from the EC device. Multipurpose controllers described herein exploit this phenomenon by capturing and/or diverting this charge to a power grid for reuse.

Although the foregoing invention has been described in some detail to facilitate understanding, the described embodiments are to be considered illustrative and not limiting. It will be apparent to one of ordinary skill in the art that certain changes and modifications can be practiced within the scope of the appended claims.

We claim:

1. A window controller for controlling one or more windows capable of undergoing reversible optical transitions, the window controller comprising one or more microprocessors configured to control functions comprising:
    measuring transmittance of at least one of the one or more windows;
    actively and reversibly powering a reversible optical transition between at least a bleached end state and a colored end state of the at least one of the one or more windows, wherein powering is based on the measured transmittance of the at least one window, wherein the at least one window comprises a first conductive layer, a second conductive layer, and an electrochromic layer between the first conductive layer and the second conductive layer, wherein powering the reversible optical transition comprises applying a DC voltage to the first conductive layer and to the second conductive layer to provide an electrical potential across the electrochromic layer establishing a load, wherein the load is floated; and
    communicating between the window controller and a separate communication node.

2. The window controller of claim 1,
    wherein the one or more microprocessors are further configured to also control the function of measuring a size of the at least one window, and
    wherein actively and reversibly powering the reversible optical transition is based on the measured transmittance and the measuring size of the at least one window.

3. The window controller of claim 2, wherein the measured size is based on current information measured at the at least one window.

4. The window controller of claim 1, wherein the one or more microprocessors are further configured to also control functions of:
    determining damage to at least one window of the one or more windows based on current information; and
    in response to determining damage, repairing the at least one window by sending a high voltage current through the at least one window for a period of time.

5. A building management system for controlling systems in a building to maintain a comfortable environment, the building management system comprising the window controller of claim 1.

6. The building management system of claim 5, wherein the systems are selected from the group consisting of HVAC, lighting, security, power, fire suppression and elevator control systems.

7. The window controller of claim 1, wherein the one or more microprocessors are further configured to also control functions of:
    determining a wire length between the window controller and the at least one window; and
    determining an amount of power used to actively and reversibly power the reversible optical transition based on the determined wire length.

8. The window controller of claim 1, wherein the one or more microprocessors are further configured to also control a function of determining temperature of the at least one window based on current information.

9. The window controller of claim 1, wherein the one or more microprocessors are further configured to also control a function of storing charge resulting from a transition of at least one of the one or more windows and/or direct such charge to a power grid.

10. An apparatus comprising:
    (i) a Building Management System (BMS) for controlling systems in a building;
    (ii) the window controller of claim 1 controlled by the BMS; and
    (iii) a multistate electrochromic window controlled by the window controller.

11. An apparatus comprising:
    (i) the window controller of claim 1; and
    (ii) an electrochromic window controlled by the window controller.

12. The apparatus of claim 11, wherein the electrochromic window is all solid state and inorganic.

13. The apparatus of claim 12, wherein the electrochromic window is a multistate electrochromic window.

14. The window controller of claim 1, wherein the controller is configured or designed to direct or coordinate the operation of one or more other controllers, which control operations of said windows.

15. The window controller of claim 1, wherein the measured transmittance is based on current information measured at the at least one window.

16. The window controller of claim 15, wherein the one or more microprocessors are further configured to also control functions of:
    sending an electrical pulse through the at least one window; and
    determining the current information of the at least one window based on a measured response to the electrical pulse.

17. The window controller of claim 1, wherein the one or more microprocessors are further configured to also control a function of heating at least one of the one or more windows by passing current through one or more electrodes at the at least one window.

18. The window controller of claim 1, wherein the one or more microprocessors are further configured to also control a function of storing and transmitting data relating to at least one of the one or more windows via an RFID tag that is actively or passively powered or via memory.

19. The window controller of claim 1, wherein the actively and reversibly powering is configured for short transition times.

20. The window controller of claim 1, wherein the one or more microprocessors are further configured to actively and reversibly power a reversible optical transition to or from one or more intermediate states.

21. The window controller of claim 1, wherein the window controller comprises a pulse width amplifier rendered as an h-bridge or a buck converter, wherein the pulse width amplifier is configured to actively and reversibly power the reversible optical transition.

22. The window controller of claim 1, wherein the actively and reversibly powering the reversible optical transition between at least the bleached state and the colored end state comprises applying a voltage to an electrochromic device of the at least one of the one or more windows while in the bleached end state.

23. A method of controlling systems in a building by a building management system, the method comprising:
using transmittance data, by a window controller, from one or more windows in the building, the one or more windows capable of undergoing reversible optical transitions between at least bleached end states and colored end states in the building, wherein the measured transmittance data is used as input for adjusting at least one other system of the building, said other system selected from the group consisting of HVAC, lighting, security, power, fire suppression and elevator control; and
actively and reversibly powering a reversible optical transition between at least a bleached end state and a colored end state of at least one of the one or more windows, wherein powering is based on the measured transmittance data of the at least one window, wherein the at least one window comprises a first conductive layer, a second conductive layer, and an electrochromic layer between the first conductive layer and the second conductive layer, wherein powering the reversible optical transition comprises applying a DC voltage to the first conductive layer and to the second conductive layer to provide an electrical potential across the electrochromic layer establishing a load, wherein the load is floated.

24. The method of claim 23, further comprising measuring by the window controller one or more of the following types of data about the one or more windows:
transmittance, size, temperature.

25. The method of claim 23, further comprising storing data, in memory embedded in the one or more windows and separate from the window controller, about the one or more windows.

26. The method of claim 23, further comprising providing power from the controller to the one or more windows, said power driving the reversible optical transitions.

27. The method of claim 23, further comprising:
measuring transmittance of the at least one of the one or more windows;
determining temperature of at least one of the one or more windows;
communicating between the window controller and a separate communication node; and
storing and transmitting data relating to at least one of the one or more windows via an RFID tag that is actively or passively powered.

28. A window controller for controlling one or more windows capable of undergoing reversible optical transitions, the window controller comprising one or more microprocessors configured to control functions of the one or more windows, the functions comprising:
(a) measuring transmittance of at least one of the one or more windows based on current information measured at the at least one window;
(b) actively and reversibly powering a reversible optical transition between at least a bleached end state and a colored end state of the at least one window, wherein powering is based on the measured transmittance of the at least one window, wherein the at least one or more windows comprises a first conductive layer, a second conductive layer, and an electrochromic layer between the first conductive layer and the second conductive layer, wherein powering the reversible optical transition comprises applying a DC voltage to the first conductive layer and to the second conductive layer to provide an electrical potential across the electrochromic layer establishing a load, wherein the load is floated; and
(c) communicating between the window controller and a separate communication node.

29. The window controller of claim 28, wherein the function of actively and reversibly powering the reversible optical transition between at least the bleached end state and the colored end state is implemented with pulse width amplifier rendered as an h-bridge or a buck converter.

30. The window controller of claim 28,
wherein the one or more microprocessors are further configured to also control a function of determining temperature of at least one window of the one or more windows, and
wherein the function of determining temperature of the at least one of the one or more windows is implemented by algorithmically inferring temperature from current and/or voltage information from the at least one window.

31. The window controller of claim 28,
wherein the one or more microprocessors are further configured to also control a function of storing and transmitting data relating to the at least one window,
wherein the function of storing and transmitting data relating to at least one of the one or more windows comprises reading data from a controller embedded in the at least one window.

32. The window controller of claim 28, wherein the one or more microprocessors are further configured to also control functions of:
determining a size of the at least one window; and
determining an amount of power for powering the reversible optical transition based on the determined size.

33. The window controller of claim 28, wherein the one or more microprocessors are further configured to also control functions of:
sending an electrical pulse through the at least one window; and
determining the current information of the at least one window based on a measured response to the electrical pulse.

34. The window controller of claim 28, wherein the one or more microprocessors are further configured to also control functions of:
determining temperature of at least one of the one or more windows; and
storing and transmitting data relating to at least one of the one or more windows.

35. A window controller for controlling a window capable of undergoing reversible optical transitions, the window controller comprising:
a voltage regulator;
a voltage control amplifier for generating current to power the window; and a microprocessor powered by the voltage regulator, the microprocessor configured to control the functions of:

actively and reversibly powering a reversible optical transition between at least a bleached end state and a colored end state of the window based on window data received from memory embedded in the window and separate from the window controller, wherein the window data includes measured transmittance of the window, wherein the window comprises a first conductive layer, a second conductive layer, and an electrochromic layer between the first conductive layer and the second conductive layer, wherein powering comprises applying a DC voltage to the first conductive layer and to the second conductive layer to provide an electrical potential across the electrochromic layer establishing a load, wherein the load is floated;

communicating between the window controller and a separate communication node; and storing the window data to the memory.

36. The window controller of claim 35, wherein powering the reversible optical transition comprises determining a desired tint level and powering the reversible optical transition of the window to the desired tint level.

37. The window controller of claim 35, wherein the voltage control amplifier is a pulse width modulated amplifier rendered as an h-bridge or a buck converter.

38. The window controller of claim 35, wherein the voltage control amplifier comprises a pulse width modulated amplifier rendered as a buck converter and a separate polarity switch configured to allow a load to set to a voltage or polarity between an input voltage to the window controller and ground.

* * * * *